US012540453B2

(12) United States Patent
Martel et al.

(10) Patent No.: US 12,540,453 B2
(45) Date of Patent: *Feb. 3, 2026

(54) FLUID JET AGRICULTURAL DEVICES, SYSTEMS AND METHODS

(71) Applicant: Susterre Technologies Inc., Toronto (CA)

(72) Inventors: Jeff Martel, Grimsby (CA); Matthew Popper, Cayuga (CA); Arion Vandergon, St. Louis Park, MN (US); Cedar Vandergon, New Brighton, MN (US); David Bunker, Stoney Creek (CA); Kyle Wilson, Burlington (CA); Garrett Quillia, Enfield, NH (US)

(73) Assignee: Susterre Technologies Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,130

(22) Filed: Jun. 12, 2024

(65) Prior Publication Data

US 2024/0337090 A1 Oct. 10, 2024

Related U.S. Application Data

(63) Continuation of application No. 16/733,764, filed on Jan. 3, 2020, now Pat. No. 12,037,766.

(Continued)

(51) Int. Cl.
*E02F 3/92* (2006.01)
*A01B 49/06* (2006.01)
(Continued)

(52) U.S. Cl.
CPC .......... *E02F 3/9218* (2013.01); *A01B 49/065* (2013.01); *A01B 79/02* (2013.01); *E02F 5/02* (2013.01)

(58) Field of Classification Search
CPC ........ E02F 3/9218; E02F 5/02; A01B 49/065; A01B 79/02
(Continued)

(56) References Cited

U.S. PATENT DOCUMENTS 5,370,069 A 12/1994 Monroe
5,605,105 A 2/1997 Clark et al.
(Continued)

FOREIGN PATENT DOCUMENTS

AU 3851772 A 9/1973
AU 2017202558 A1 11/2017
(Continued)

OTHER PUBLICATIONS

"Notification of Transmittal of the International Search Report and the Written Opinion of the International Searching Authority, or the Declaration," International Filing Date: Jan. 9, 2025, International Application No. PCT/US2025/010918, Date of Mailing: Apr. 9, 2025, pp. 1-20.

(Continued)

*Primary Examiner* — Tara Mayo
(74) *Attorney, Agent, or Firm* — Cesari and McKenna, LLP

(57) ABSTRACT

An ultra high-pressure liquid jet soil processing system of an agricultural implement is provided. The ultra high-pressure liquid jet soil processing system includes a frame, an ultra high pressure liquid pump disposed on the frame, a set of ultra high-pressure lines fluidly connected to the ultra high pressure liquid pump, and at least a first liquid jet soil implementation head and a second liquid jet soil implementation head fluidly connected to the ultra high pressure liquid pump via the set of ultra high-pressure lines. The first and second implementation heads are configured to condition soil for seed deposition by generating a plurality of trenches.

13 Claims, 14 Drawing Sheets

Related U.S. Application Data

(60) Provisional application No. 62/787,993, filed on Jan. 3, 2019.

(51) Int. Cl.
*A01B 79/02* (2006.01)
*E02F 5/02* (2006.01)

(58) Field of Classification Search
USPC .................................................. 111/118, 127
See application file for complete search history.

(56) References Cited

U.S. PATENT DOCUMENTS

| | | |
|---|---|---|
| 10,136,571 B2 | 11/2018 | Butler et al. |
| 12,037,766 B2 | 7/2024 | Martel et al. |
| 2010/0175600 A1 | 7/2010 | Cruson |
| 2014/0263760 A1 | 9/2014 | Hanna et al. |
| 2015/0208574 A1 | 7/2015 | des Garennes et al. |
| 2017/0110345 A1 | 4/2017 | Nasman et al. |
| 2017/0303460 A1 | 10/2017 | Butler et al. |
| 2019/0133018 A1 | 5/2019 | Butler et al. |
| 2020/0217044 A1 | 7/2020 | Martel et al. |
| 2021/0007268 A1 | 1/2021 | Stokkermans |

FOREIGN PATENT DOCUMENTS

| | | |
|---|---|---|
| CN | 101099423 A | 1/2008 |
| CN | 101346186 A | 1/2009 |
| CN | 101715673 A | 6/2010 |
| CN | 102733389 A | 10/2012 |
| CN | 106132189 A | 11/2016 |
| CN | 107787773 A | 3/2018 |
| CN | 108024498 A | 5/2018 |
| EP | 2777819 A | 9/2014 |
| RU | 2038731 C1 | 7/1995 |
| SU | 287442 A1 | 11/1970 |
| SU | 843819 A1 | 7/1981 |
| WO | 9611564 A1 | 4/1996 |

OTHER PUBLICATIONS

Butler, G., "Aqua-Till—seeding without soil engagement" SANTFA—The No-Till Journal vol. 8 No. 2, Apr. 2011, 7 pages.

"Chinese Search Report for Chinese Application No. 202080007900.2", dated Aug. 18, 2022, pp. 1-7.

"Notification of Transmittal of the International Search Report and the Written Opinion of the International Searching Authority, or the Declaration," International Filing Date: Jan. 3, 2020, International Application No. PCT/US2020/012171, Date of Mailing: Apr. 20, 2020, pp. 1-19.

"Russian Search Report," Federal Service on Intellectual Property, Federal State Budgetary Enterprise "Federal Institute of Industrial Property" (FIPS), May 23, 2023, pp. 1-2.

"Canadian Office Action," Canadian Intellectual Property Office (CIPO), Canadian Patent Application No. 3120790, Date of Mailing: May 23, 2025, pp. 1-10.

FLUID JET AGRICULTURAL DEVICES, SYSTEMS AND METHODS

CROSS REFERENCE TO RELATED APPLICATION

This application is a continuation of U.S. patent application Ser. No. 16/733,764, filed Jan. 3, 2020, which claims benefit of and priority to U.S. Provisional Patent Application No. 62/787,993, filed Jan. 3, 2019. The entire contents of these applications are owned by the assignee of the instant application and incorporated herein by reference in their entireties.

TECHNICAL FIELD

The present invention generally relates to ultra-high pressure liquid jet soil processing devices, systems and methods.

BACKGROUND

Current planting and seeding systems and processes generally utilize three different types of devices—one or more opening devices for opening the soil, one or more seeding devices for depositing seeds into the opened portion of the soil, and one or more closing devices for closing the soil on top of the deposited seeds. For the opening devices, these systems and processes rely heavily on cultivating, plowing, or tilling the ground prior to or at about the same time as seeding. These processes often use a coulter to initially cut through residue on top of the soil and loosen (e.g., open) the soil to allow for access and penetration of air, water, and nutrients (e.g., fertilizer) and provide opportunities to fertilize and seed at a given/desired depth (e.g., deliver nutrients and seeds up to 4 to 6 inches deep in the soil). Currently, this is accomplished by dragging or forcing physical implements, such as plows, blades, coulters, residue cutting coulters, tills, hoes, tines, etc., through the soil at speeds between 2 and 15 miles per hour. After application of a coulter to open the soil, one or more additional opening devices (e.g., hoes, keels, etc.) are typically used to condition and shape the initial opening made by the coulter to further prepare and form the opening for seed deposition.

In many traditional implementations, a coulter is configured as a knife/blade-like device for cutting through the residue and opening soil. Some newer designs have replaced the knife-point coulter with a rotating disc coulter, which can have a wavy or straight blade. FIG. 1 shows an exemplary prior art rotating disc coulter with a wavy blade. In operation, a coulter, such as the coulter of FIG. 1, pierces the ground in advance of application of a hoe or a disk setup that further conditions and shapes the soil. Generally, dragging a coulter through the soil serves to cut through residue, turn over the soil, and provide a seed bed, thus exposing a select portion of the ground (e.g., a trench) at a given depth to atmosphere and making the exposed soil portion available for application of desired materials and liquids (e.g., seeds, fertilizers, etc.).

FIG. 2 shows some exemplary prior art solid soil hoes employed in conventional agricultural systems and methods. Traditionally, usage of these hoes in planting operations are preceded by a coulter (such as the coulter of FIG. 1) that cuts through the residue and soil. The different hoes of FIG. 2 may be employed with different coulters for different processes and/or seeds as varying depths and trench shapes may be desired. A seeding device can then be used to deposit materials at the desired depth in a trench formed by the coulter and the hoes. Thereafter, a closing device can be used to close the trench. Most planting systems have a closing system (e.g., a press wheel and/or closing tool) connected behind and in line with the coulters and the hoes to immediately close the soil after seed deposit.

FIG. 3 shows an exemplary prior art planting system 300 that includes a combination of several opening devices, a seeding device and a closing device. The opening devices comprise a coulter 306 and two hoes 304a, 304b. The closing device 302 is used to fill in and reseal a trench as well as level the field soil and retain the residue. The seeding device 308 is located between the opening devices 304a, b, 306 and the closing device 302. As shown, the seeding device 308 can be coupled to the secondary opening device 304b. However, the use of such conventional tillage arrangement(s) can cause a process called "smearing" of the soil as the trench is opened and closed, much like applying frosting to a cake. Severe smearing can seal out water from the soil because it compacts and closes the pores between the particles in the soil. This effect tends to worsen with higher moisture levels in the soil, which can lead to delays in planting. The higher moisture levels in the soil can be contributed to by weather and/or the presence of heavy dew at certain times during the day, which can render seeding conditions unfavorable.

Further, conventional coulters, such as the coulters of FIGS. 1 and 3, generate large amounts of dust, soil throw, and wear and tear on farming tools, tractors, and blades, and have poor residue retention. In particular, the action of dragging implements through the soil and residue to open a trench typically results in large amounts of residue being caught around the implements and dragged around in the field and trench (and/or off of the field and trench), which leaves the soil directly exposed to the environment and significantly reduces moisture retention while increasing soil erosion. Generally, downstream effects of the current solid coulter-based farming practices include increased soil erosion, reduced soil biological fertility, decreased soil resiliency, environmental damages, and production inefficiencies.

Recent coulter and seeding system designs have sought to reduce these impacts and effects by employing even narrower and sharper blades (e.g., knifepoint systems) on coulters and closing systems. FIG. 4 shows a portion of an exemplary prior art planting system with a knifepoint coulter 400. However, these systems still physically manipulate the soil in several non-beneficial ways and remove large quantities of residue. Further, these systems have trouble with proper and consistent penetration, stubble management, working through cover crops, and residue hair-pinning.

SUMMARY

The present invention features agricultural soil systems and processes (e.g., soil cultivation, fertilizer deposition, seeding processes, etc.) that incorporate one or more fluid jet cutting heads for penetrating soil using fluid jets, such as liquid jets or gas jets. This minimizes (and in some cases eliminates) the usage of solid and physical coulters, thereby reducing tilling, residue waste, and disturbance while improving agricultural processes.

The present invention, in one aspect, features an ultra high-pressure liquid jet soil processing system of an agricultural implement. The ultra high-pressure liquid jet soil processing system comprises a frame, an ultra high-pressure liquid pump disposed on the frame, and a set of ultra high-pressure lines fluidly connected to the ultra high-pressure liquid pump. The processing system also includes at least a first liquid jet soil implementation head and a second liquid jet soil implementation head fluidly connected to the ultra high-pressure liquid pump via the set of ultra high-pressure lines. The first and second implementation heads are configured to condition soil for seed deposition by generating a plurality of trenches.

In some embodiments, the ultra high-pressure liquid jet soil processing system further includes a third liquid jet soil implementation head fluidly connected to the ultra high-pressure liquid pump. The third implementation head configured to periodically transect the plurality of trenches. The third liquid jet soil implementation head can be configured to deliver a liquid jet to promote soil collapse relative to at least one trench.

In some embodiments, the ultra high-pressure liquid pump is configured to generate a liquid pressure of at least about 20,000 pounds per square inch (PSI). The ultra high-pressure liquid pump can be a direct drive pump. The ultra high-pressure liquid pump can include an intensifier.

In some embodiments, a corresponding trench created by the first liquid jet soil implementation head is configured to receive periodic deposits of seeds. In some embodiments, a first trench created by the first liquid jet soil implementation head is proximate to a second trench created by the second liquid jet soil implementation head, the second trench adapted to receive an agricultural additive proximate to one or more seeds deposited in the first trench.

In some embodiments, the first and second trenches intersect at a user-controllable depth below a surface of the soil. In some embodiments, a tip of the second liquid jet soil implementation head is located below ground level when conditioning soil for seed deposition. In some embodiments, the second liquid jet soil implementation head is staggered relative to the first liquid jet soil implementation head.

In some embodiments, at least one of the first or second liquid jet soil implementation head is configured to deposit an input in a corresponding trench. In some embodiments, a soil input system is fluidly connected to the at least one first or second liquid jet soil implantation head for introducing an agricultural additive as the input to the corresponding trench.

In another aspect, the invention features a soil implementation head for an ultra high-pressure liquid jet agricultural implement. The soil implementation head comprises a body configured to receive an ultra high-pressure liquid and a fertilizer. The body defines a mixing chamber configured to mix the fertilizer into the ultra high-pressure liquid. The soil implementation head also comprises a nozzle disposed in the body and fluidly connected to the mixing chamber, the nozzle shaped to convey a mixture of the fertilizer and the ultra high-pressure liquid into soil in a liquid jet.

In some embodiments, the soil implementation head further comprises a shroud system fluidly connected to the body. The shroud system is configured to provide a fluid medium to substantially shroud the liquid jet between a tip of the nozzle and a surface of the soil. The shroud system can be integral to the body of the soil implementation head. The fluid medium of the shroud system can be at least one of a liquid, a fertilizer, a gas, or water. In some embodiments, the shroud system is controlled via an on/off valve for selectively activating the shrouding.

In some embodiments, a gas input system is fluidly connected to the body of the soil implementation head. The gas input system is configured to introduce a gas to the liquid jet.

In some embodiments, the ultra high-pressure liquid is at least one of (i) heated to promote germination or (ii) treated to prevent fungus growth. The ultra high-pressure liquid can be heated using excess heat from one of a hydraulic pump or another component of the agricultural implement.

In yet another aspect, the invention features an ultra high-pressure liquid jet soil processing system for an agricultural implement. The ultra high-pressure liquid jet soil processing system comprises an ultra high-pressure liquid pump, a set of ultra high-pressure lines fluidly connected to the ultra high-pressure liquid pump, and a liquid jet soil implementation head fluidly connected to the ultra high-pressure liquid pump via the set of ultra high-pressure lines. The implementation head is configured to condition soil for seed deposition. The ultra high-pressure liquid jet soil processing system also comprises an input system fluidly connected to the liquid jet soil implementation head. The input system is configured to deliver an agricultural additive to a liquid jet formed in the implementation head.

In some embodiments, the input system is connected to the implementation head via a liquid fertilizer line that is coupled to a vent line at a one-way valve to prevent at least one of contamination or back pressure of the liquid fertilizer line. In some embodiments, the vent line is connected to a pressure regulation system. In some embodiments, the pressure regulation system comprises one of a snorkel line vented to atmosphere, an air filter, or a source of compressed fluid. The pressure regulation system can be distant from an interface between the processing system and the soil. In some embodiments, the vent line is coupled to an audible alert element to alert operator when at least one of contamination or back pressure occurs in the liquid fertilizer line or the vent line.

In some embodiments, the liquid jet soil implementation head is directly connected to a compressed air or gas line. In some embodiments, the compressed air or gas line delivers a compressed air or gas to a mixing chamber of the implementation head to provide a positive pressure in the mixing chamber, thereby preventing contaminants from entering the mixing chamber.

In some embodiments, the input system is configured to selectively deliver the agricultural additive to the liquid jet. In some embodiments, the selective delivery comprises introduction, by the input system, of a granular fertilizer as the agricultural additive after formation of the liquid jet to promote particlization of grains in the fertilizer. In some embodiments, the selective delivery comprises introduction, by the input system, of at least one gas as the agricultural additive to below a surface of the soil.

In some embodiments, the implementation head comprises a nozzle and an orifice. A ratio of a diameter of the nozzle to a diameter of the orifice is greater than about 2.

In yet another aspect, the invention features a method of operating an ultra high-pressure liquid jet soil processing system of an agricultural implement for conditioning soil for seed deposition. The ultra high-pressure liquid jet soil processing system includes a plurality of implementation heads fluidly connected to an ultra high-pressure liquid pump via a set of ultra high-pressure lines. The method comprises forming at least two trenches in the soil by a first implementation head and a second implementation head, periodically depositing, by a seeding device, seeds into a trench formed by the first implementation head, and periodically providing, by at least one of the first or the second implementation head, an additive input into a corresponding trench.

In some embodiments, the method further comprises periodically transacting, by a third implementation head, the first and second trenches to promote soil collapse on the additive input and the seed. In some embodiments, the method further comprises keeling the soil by a closing device to close the trenches.

In some embodiments, the at least two trenches are located proximate to each other at a user-controllable distance.

In some embodiments, periodically providing an additive input into a corresponding trench comprises receiving, by a body of the first implementation head, an ultra high-pressure liquid and the additive input, where the body defines a mixing chamber for mixing the ultra high-pressure liquid and the additive input, and delivering to the trench, by a nozzle of the first implementation head, a liquid jet comprising the mixed ultra high-pressure liquid and the additive input. In some embodiments, the method further comprises substantially shrouding the liquid jet in a fluid medium between a tip of the nozzle and a surface of the trench. In some embodiments, the method further comprises providing a positive pressure in the mixing chamber to prevent containments from entering the mixing chamber via the nozzle.

In some embodiments, the additive input is a liquid fertilizer provided to at least one of the first or second implementation head via a liquid fertilizer line. In some embodiments, the method further comprises preventing contamination and back pressure of the liquid fertilizer line using a one way valve and a filtered vent.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

While the embodiments herein are described in the context of soil processing, field seeding and planting, it is understood by a person of ordinary skill in that art that these designs can also be separately and jointly applied to non-seeding agricultural systems and methods, such as to fertilizer application, mineral application, pesticide application, etc. Further, while the soil processing system of the present invention is described to convey liquid jets for soil processing, the system is capable of conveying fluid jets (e.g., liquid jets or gas jets) without alteration of the system configuration, as understood by a person of ordinary skill in the art.

Figure 5A:
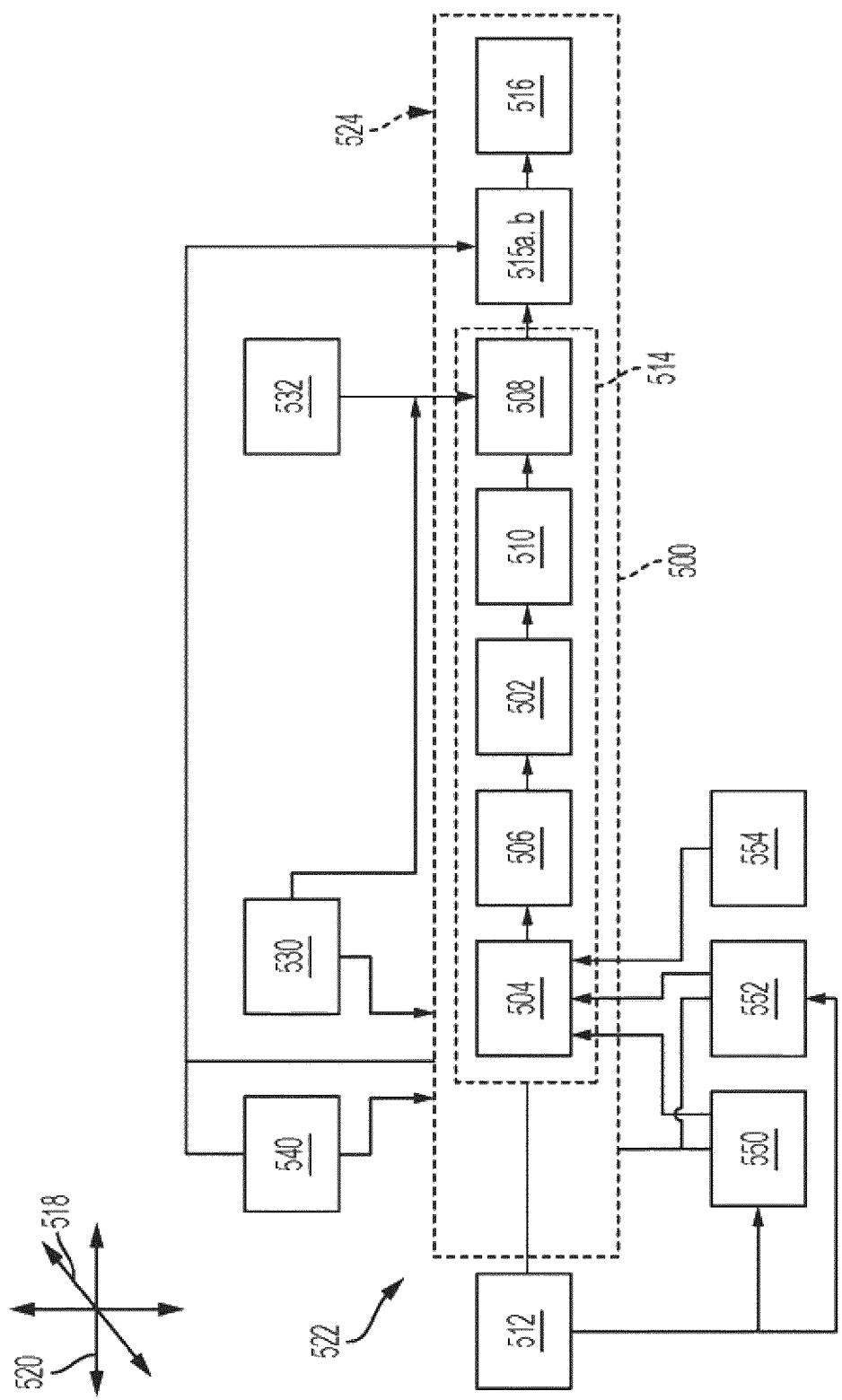
FIG. 5a shows a block diagram of an exemplary agricultural planter that includes an ultra high-pressure liquid jet soil processing system 514, according to some embodiments of the present invention.
Figure 5B:
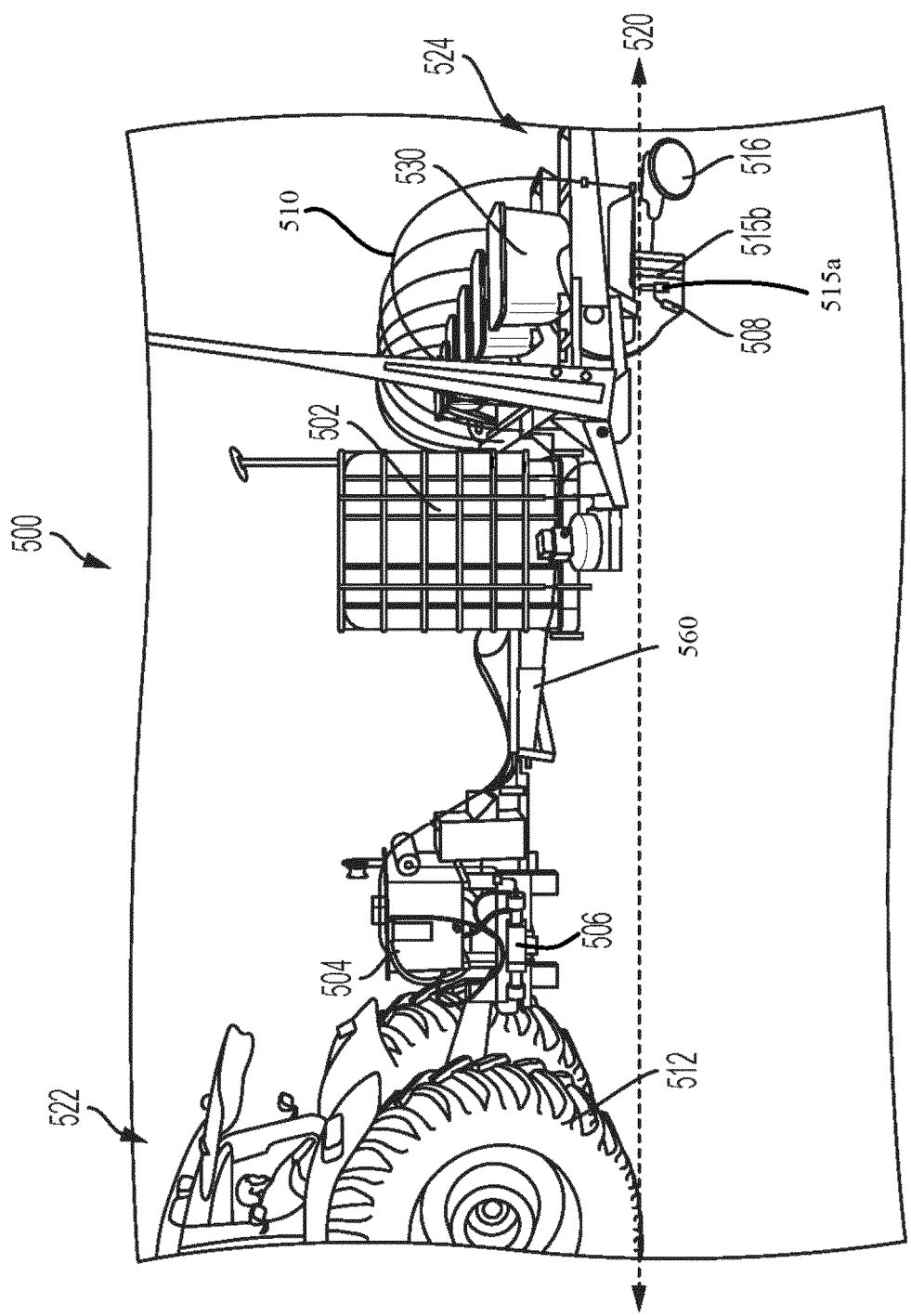
FIG. 5b shows an exemplary configuration of the agricultural planter of FIG. 5a, according to some embodiments of the present invention.

FIG. 5a shows a block diagram of an exemplary agricultural planter 500 that includes an ultra high-pressure liquid jet (e.g., over 5,000 pounds per square inch (PSI)) soil processing system 514 (herein referred to as an ultra high-pressure liquid jet coulter system), according to some embodiments of the present invention. FIG. 5b shows an exemplary configuration of the agricultural planter 500 of FIG. 5a, according to some embodiments of the present invention. As shown in FIG. 5a, the planter 500 generally defines a lateral axis 518, a longitudinal axis 520 with a distal end 522 for connection to a mobile unit 512 (e.g., a tractor) and a proximal end 524 for interaction with the soil. The lateral axis 518 extends laterally from the longitudinal axis 520 across the field at an orthogonal angle with respect to the longitudinal axis 520. Specifically, the planter 500 is coupled to the mobile unit 512 at its distal end 522, where the mobile unit is configured to move the planter 500 across a field to be cultivated. In some embodiments, the mobile unit 512 is a tractor adapted to navigate in the distal direction while dragging the planter 500 behind. The planter 500 includes a number of components disposed on a frame and operably connected along the longitudinal axis 520. As shown, the planter 500 generally includes the liquid jet coulter system 514 for cutting through the soil to form a trench and/or depositing one or more agricultural inputs (e.g., pesticide, fertilizer, etc.) into the soil, followed by one or more additional opening devices 515a, seeding devices 515b and closing devices 516. Each of the one or more additional opening devices 515a is configured to further shape and/or form a trench created by the coulter system 514. Each seeding device 515b is configured to seed a trench. Each closing device 516 is located at the proximal end 524 of the planter 500 and configured to close a trench after seed and/or input deposition.

In some embodiments, the planter 500 includes an input system 530 configured to store at least one agricultural input, such as a fertilizer and/or another liquid (e.g., water), for supply to the coulter system 514 in a manner described below with reference to FIGS. 14 and 15. The input system 530 can be a stand-alone component of the planter 500 or pre-mixed with the liquid in the liquid tank 502. The planter 500 can also include a pressure regulation system 532 in fluid communication with the coulter system 514 for regulating the pressure of the input supply line between the input system 530 and the coulter system 514 and preventing contamination of the coulter system 514 and/or the input system 530. The pressure regulation system 532 is described in detail below in relation to FIG. 15. The planter 500 further includes one or more sources of seeds 540 that are accessible by the seeding device 515b for deposition into seed trenches. Also as illustrated in FIG. 5a, the planter 500 can include at least one hydraulic unit 552 for operating one or more of the pumps 504, intensifiers 506, and/or other pressure-generating equipment. The planter 500 can further include a power unit 550 and at least one optional auxiliary power unit 554 unit for powering various planter components, including circuitry in the hydraulic unit 552.

Figure 1:
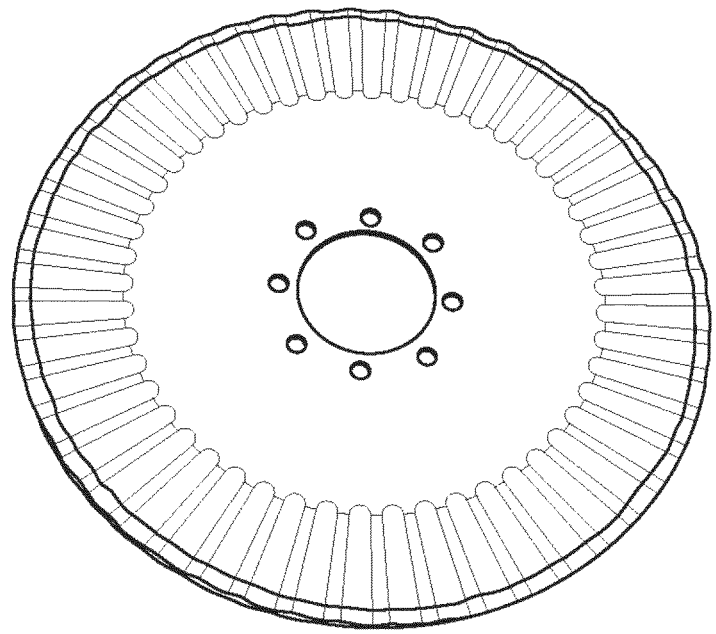
FIG. 1 shows an exemplary prior art rotating disc coulter with a wavy blade.
Figure 2:
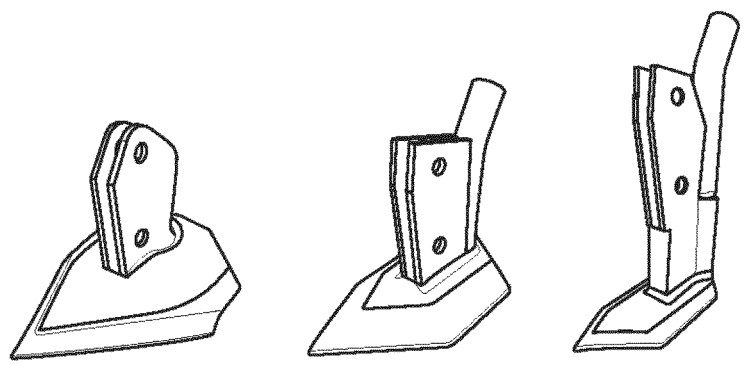
FIG. 2 shows some exemplary prior art solid soil hoes employed in conventional agricultural systems and methods.
Figure 3:
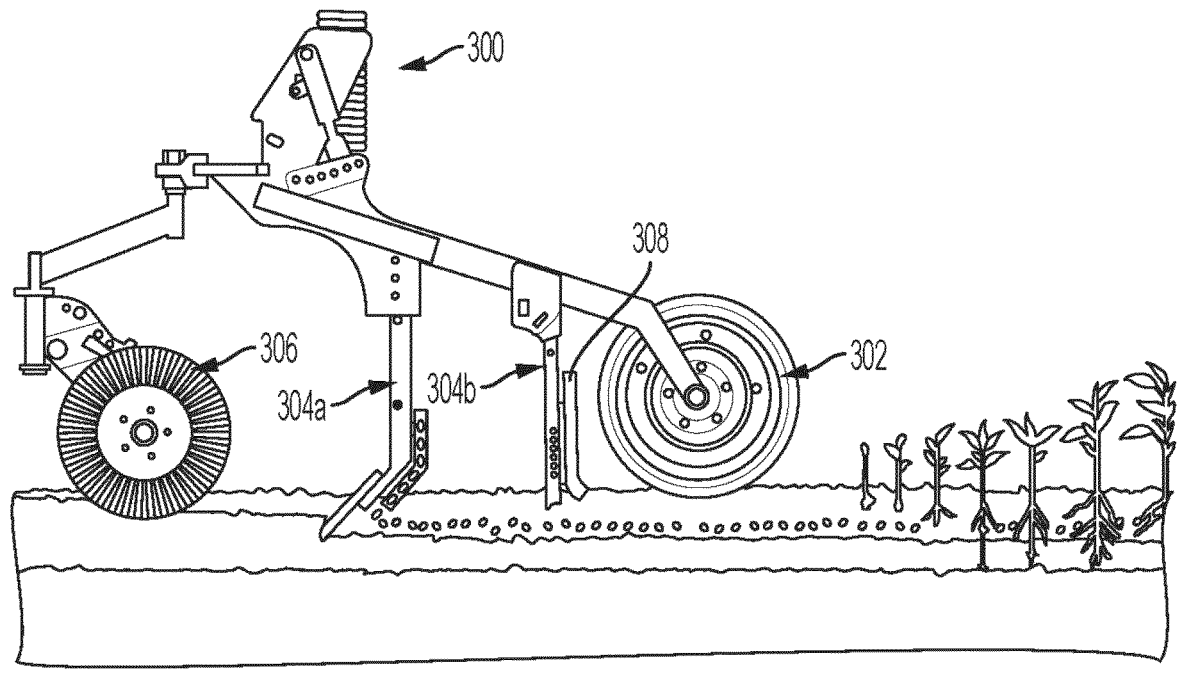
FIG. 3 shows an exemplary prior art planting system that includes a combination of several opening devices, a seeding device and a closing device.
Figure 4:
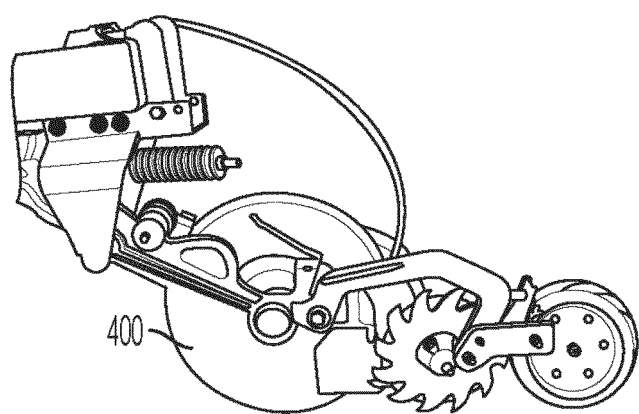
FIG. 4 shows a portion of an exemplary prior art planting system with a knifepoint coulter.

As shown, the ultra high-pressure liquid jet coulter system 514 includes at least one liquid tank 502, at least one ultra high-pressure liquid jet pump 504, one or more optional intensifiers 506, and a set of one or more liquid jet soil implementation heads 508 (hereinafter referred to as liquid jet cutting heads). The liquid jet cutting heads 508 are fluidly connected to the pump 504 and the optional intensifier 506 via a set of ultra high-pressure lines 510. The optional intensifier 506 can be operably attached to the pump 504 or integrated with the pump 504. Generally, the liquid jet coulter system 514 is configured to replace the conventional solid physical coulter, such as the rotating disc coulter of FIG. 2 or the knifepoint coulter of FIG. 4, by supplying liquid jets via the multiple liquid jet cutting heads 508 to cut through residue and open soil as well as to develop and access seed beds. The liquid jet coulter system 514 is configured to finely, precisely, consistently and quickly cut through residue and soil to assist in forming seed trenches in advance of the seeding device 515b planting seeds and the closing device 516 closing the soil to bury the seeds. The various components of the coulter system 514 can be disposed on a unified frame of the planter 500 or distributed among multiple detachable sections of a frame, as described in detail below with reference to FIGS. 18-20.

In some embodiments of the liquid jet coulter system 514, the pump 504 and the optional intensifier 506 are configured to draw liquid from the liquid tank 502 and pressurize the drawn liquid to, for example, between about 5,000 Pounds per Square Inch (PSI) and over 90,000 PSI. In some embodiments, the ultra high-pressure liquid pump 504 and the optional intensifier 506 are configured to generate a liquid pressure of at least about 20,000 PSI. In some embodiments, the ultra high-pressure pump 504 is a direct drive pump and as such does not include the intensifier 506. In some embodiments, the ultra-high pressure liquid is water or a mixture of water and an input (e.g., fertilizer, fungicide, etc.). For example, the ultra-high pressure liquid can be treated with an additive to prevent fungus growth and/or promote germination.

The pressurized liquid from the pump 504 and the intensifier 506 is conveyed via the high-pressure lines 510 to the set of one or more cutting heads 508, which are disposed close to the ground and the seeding device 515b. Within each of the cutting heads 508, the pressure of the liquid received from the pump 504 and the optional intensifier 506 is turned into velocity as the liquid is released through a nozzle of each cutting head 508 at several times the speed of sound.

In some embodiments, multiple intensifiers 506 are operably connected to the pump 504, each operates a subset of the liquid jet cutting heads 508. The multiple intensifiers 506 can be attached to the pump 504 in a balanced fashion, such as having an equal number on opposite sides of the pump 504. For example, if the liquid jet coulter system 514 has six liquid jet cutting heads 508, two intensifiers 506 can be used, each supplying pressurized liquid to three of the cutting heads 508.

In some embodiments, the stroke rate of the one or more pumps 504 and/or the one or more intensifiers 506 of the liquid jet coulter system 514 is correlated, controlled, and/or synced with the operational parameters of a given task being performed by the planter 500 (e.g., seeding/planting, fertilizing, etc.). For example, pump and/or intensifier stroke rate selection and speed of the mobile unit 512 may be set relative one another so as to tie the stroke rate to the seed implantation rate, such as timing one stroke extrema to the moment of seed implantation with consideration for desired seed spacing, or tying the stroke rate to another power consideration. In some embodiments, the stroke rates of the multiple intensifiers 506 can be synced and/or intentionally offset relative to one another to balance vibration in the system, power demands in the system, etc. In some embodiments, this configuration can eliminate the need for an Ultra-High Pressure (UHP) accumulator to smooth high-pressure output(s) (e.g., removing the use of accumulators from the system with multiple intensifiers). In some embodiments, the stroke rates of the pump(s) 504 and/or the multiple intensifiers 506 are offset relative to their respective cutting heads 508 (if each intensifier 506 is assigned to multiple cutting heads 508) in order to match the strokes to the particular demands of each cutting head 508 (e.g., row or seed spacing, trench depth needs, forming of discontinuous/intermittent seed trenches, etc.). By timing the strokes of specific pumps 504 and/or intensifiers 506 to system motion and/or the demands of the cutting heads 508 and processes, the operational performance and efficiency of the overall planter 500 is significantly improved. In some embodiments, at least one intensifier 506 of the coulter system 514 is a single-ended, servo-driven intensifier that is autonomously operated and pulsed with each seed implementation.

In some embodiments, the pump 504 and the intensifier 506 of the liquid jet coulter system 514 are located on non-collapsible parts of the planter frame, such as on the central non-folding base of the planter 500. For example, these ultra high-pressure components 504, 506 can be located proximate to linkage points of the frame and the roll unit, such as the linkage point 560 illustrated in FIG. 5b, which can constitute a hitch connected to the liquid jet pump 504 and/or mobile unit 512. In some embodiments, the intensifier 506 is located on a folding/collapsible portion of the planter frame, in which case it is connected to other ultra high-pressure components via the ultra high-pressure lines 510 that are configured to be flexible and/or bendable, as described below in detail.

Figure 6:
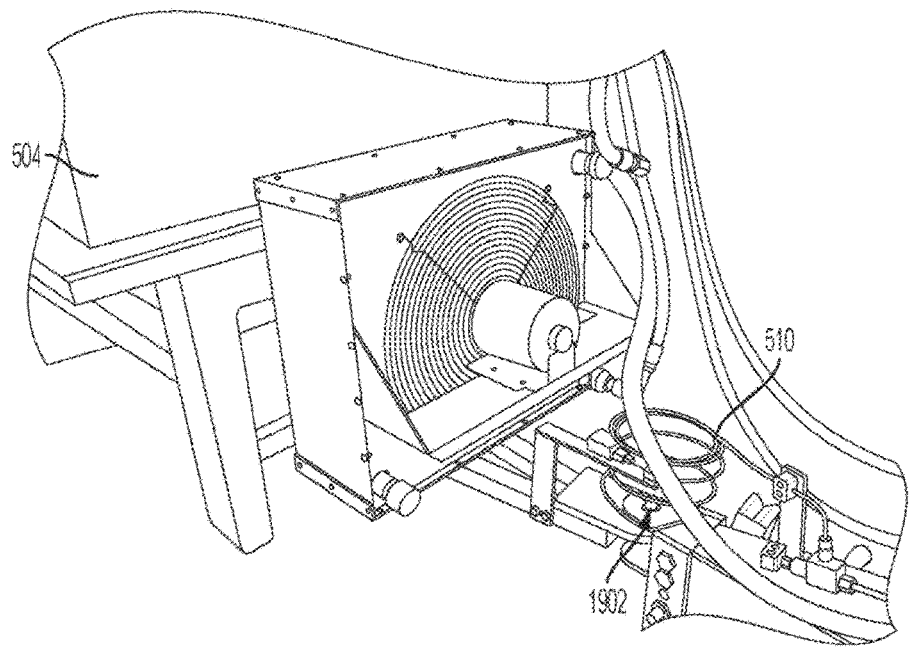
FIG. 6 shows an exemplary configuration of the ultra high-pressure lines of the coulter system 514 of FIG. 5a, according to some embodiments of the present invention.

In general, connection of the ultra high-pressure liquid generation equipment, including the pump 504 and the optional intensifier 506, to the liquid jet cutting heads 508 can provide challenges in the dynamic planter operation environment. The ultra high-pressure lines 510 of the coulter system 514 can be designed to withstand this dynamic environment. For example, the ultra high-pressure lines 510 can be one of flex hoses or coiled high pressure lines to allow for articulation and undulation during operation and transport. FIG. 6 shows an exemplary configuration of the ultra high-pressure lines 510 of the coulter system 514 of FIG. 5a, according to some embodiments of the present invention. The lines 510 are used to fluidly connect the ultra high-pressure parts of the coulter system 514, including the one or more pumps 504, intensifiers 506, liquid jet cutting heads 508, etc. As shown, the lines 510 comprise coiled high-pressure lines or partially coiled high-pressure lines located at one or more dynamic and/or pivot points 1902 of the planter frame. The coils 510 can be dual 0.25-inch coils off a ⅜-inch feed with a pivot point at a tongue of the planter 500. In some embodiments of planter systems with large implements that can require large flow rates (not shown), similar types of coil set-ups (e.g., ⅜-inch to dual 0.25-inch coiled and back to ⅜-inch) are used on other pivot points as well (e.g., at wing section pivot points, cutting head pivot points, etc.). Generally, implementing the high-pressure lines 510 as coils provides flex across one or more joints of the frame without concentrating the necessary flexing into small portions of the high-pressure lines 510, thus increasing the fatigue life of the high-pressure lines 510 in these dynamic zones.

Figure 7:
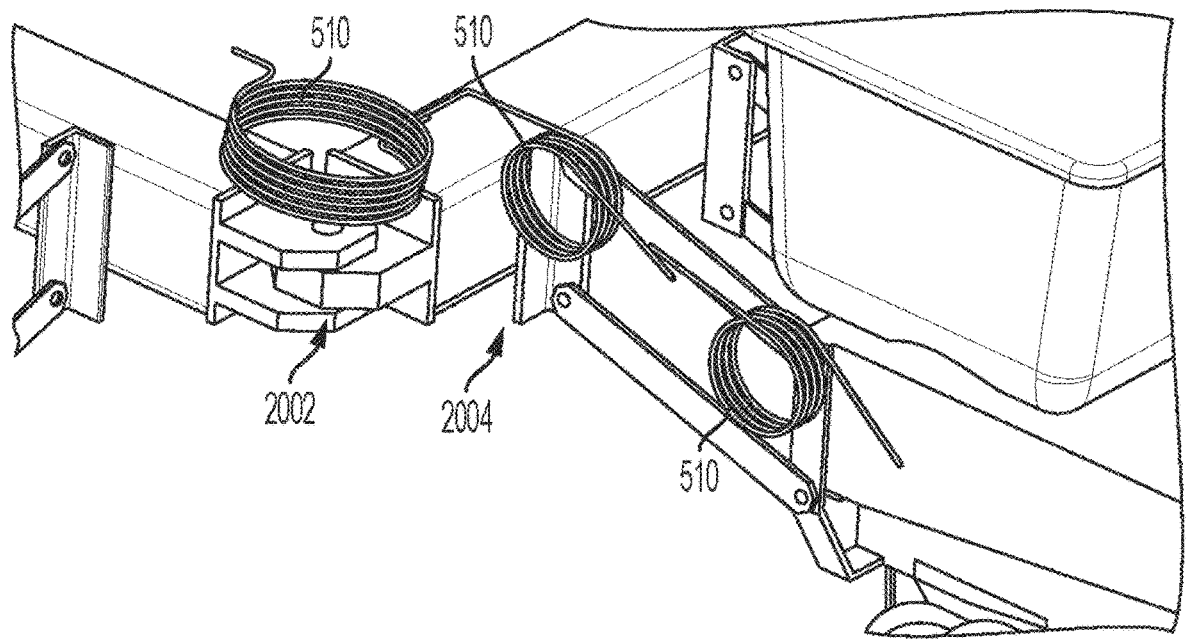
FIG. 7 shows another exemplary configuration of the ultra high-pressure lines of the coulter system 514 of FIG. 5a, according to some embodiments of the present invention.

FIG. 7 shows another exemplary configuration of the ultra high-pressure lines 510 of the coulter system 514 of FIG. 5a, according to some embodiments of the present invention. The lines 510 comprise several coiled high-pressure line sections that are located at both frame/folding pivot points 2002 and row unit linkage pivot points 2004 of the planter frame. This configuration improves robustness and durability of the planter system 500.

For both of the embodiments of FIGS. 6 and 7, coiling the high-pressure lines 510 that are used to convey high pressure liquids in the coulter system 514 prevents formation of kinks in the lines that may result from repetitive motions, folding of equipment for transport and/or storage, undulation of the ground, etc. Thus, system robustness is increased. In some embodiments, the high-pressure lines 510 comprise flexible hoses instead of the stainless-steel high-pressure tubing illustrated in FIGS. 6 and 7. The flexible hoses can function in a similar fashion as the stainless-steel tubing.

In some embodiments, the high-pressure lines 510 of the coulter system 514 of FIG. 5a are disposed on a whip of the planter system 500, as illustrated in FIG. 5b. In some embodiments, the whip is attached to the mass of the seeding device 515b so that it is not exposed to the frequency of motion of the planter system 500 as it travels across the soil. This is because the whip (and thus the motion of the high-pressure lines 510) is dampened by the heavier mass of the seeding device 515b, in contrast to the comparatively lighter closing device 516. In some embodiments, the high-pressure lines 510 are disposed on the system via a set of vibration isolation mounts.

In the planter system 500 of FIG. 5a, the at least one additional opening device 515a is used to shape a trench that is initially opened and formed by the liquid jet coulter system 514. In some embodiments, the additional opening device(s) 515a can be a disc (e.g., single or double disc) with a gauge wheel used to set the depth and width of the seed trench after a cut is formed by the liquid jet coulter system 514. In some other embodiments, the additional opening device(s) 515a can be a hoe, a tine, a keel or another type of physical device for opening and/or shaping a trench in conjunction with a depth setting mechanism (e.g., gauge wheel, ski, or other methods) that controls the seed depth. In some embodiments, the additional opening device(s) 515a is attached to (e.g., integrated with) a liquid jet cutting head 508. Alternatively, the additional opening device(s) 515a is physically separate from a liquid jet cutting head 508. In some embodiments, the additional opening device 515a is integrated with the seeding device 515b such that seed deposition is performed about the same time as the additional opening device 515a is dragged through a trench following liquid jet coulter operation.

Figure 8:
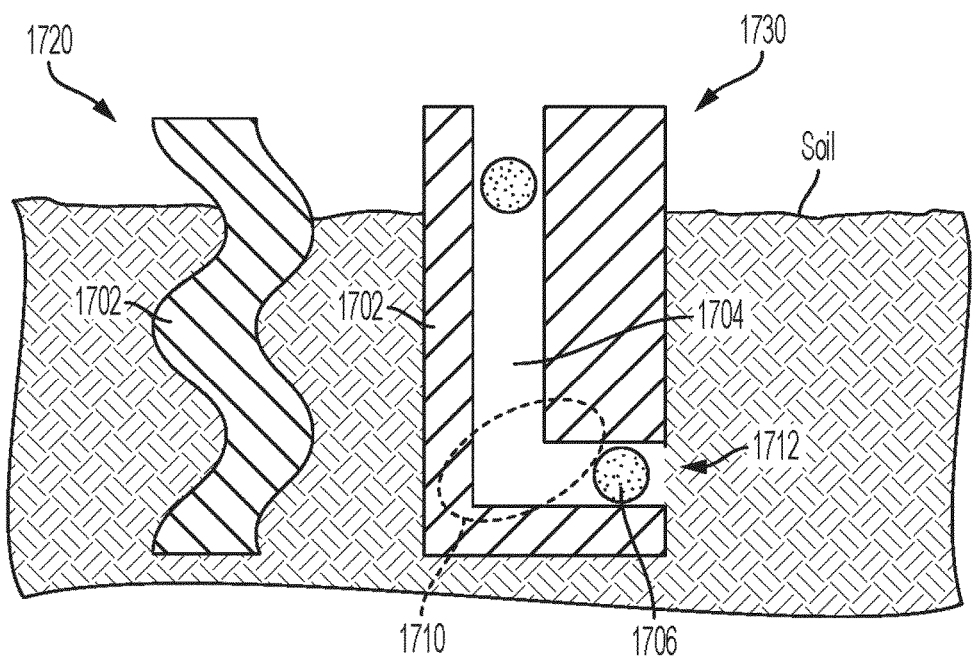
FIG. 8 shows front and cross-sectional views of an exemplary design of the seeding device of the planter of FIG. 5a, according to some embodiments of the present invention.

In some embodiments, the seeding device 515b of the planter 500 includes a keel configured to dispense seeds into a trench formed by the coulter system 514 (and further processed by the additional opening device 515a). As the keel of the seeding device 515b is dragged through the trench to deposit seeds, it physically contacts portions of the trench and soil and as such has an influence on soil conditions. In some embodiments, the design of the keel of the seeding device 515b is optimized to interact with the moist soil (due to the use of the liquid jet coulter 514) to create advantageous germination and growing conditions. FIG. 8 shows front and cross-sectional views of an exemplary design of the seeding device 515b of the planter 500 of FIG. 5a, where the seeding device 515b comprises a keel, according to some embodiments of the present invention. As shown in the frontal view 1720 of the keel 1702, the keel 1702 is ruffled and has an undulating shape in some embodiments. As the keel 1702 passes through a trench, it moves and undulates the soil forming the sidewalls of the trench, thereby agitating the soil and assisting with closing while reducing smearing (e.g., seed trench sidewall compaction). Specifically, the keel 1702 can constantly move the soil until closing so the soil does not have an opportunity to smear and is not exposed to the environment and/or atmosphere. As shown in the cross-sectional view 1730 of the keel 1702, in some embodiments, the keel 1702 defines an internal path 1704 for dispensing a seed 1706 into a trench. The path 1704 is slightly angled 1710 just prior to opening 1712 to the trench for seed deposition. In operation, once the seed 1706 is deposited by the keel 1702 after application of the liquid jet coulter 514 and the additional opening device 515a, the closing device 516 passes over the soil to close the trench 1708. In some embodiments, the keel 1702 is connected to the one or more seed sources 540 illustrated in FIG. 5a to obtain the seed 1706 for implantation.

In some embodiments, the seeding device 515b of the planter 500 is fluidly connected to the liquid tanks 502 of the liquid jet coulter system 514 and can draw liquid from the tanks 502 to convey seeds from the one or more seed sources 540 to the soil in a liquid medium rather than in the conventional air medium. This liquid may be warmed and/or treated to heat the seeds prior to deposition of the seeds in a trench, which promotes earlier/faster germination. For example, the liquid medium can be a heated mist or bath that encourages germination as the seed is being placed in the seed trench. Further, by using liquid as a medium to carry the seeds from the seed sources 540, down through the seed meter (not shown) of the seeding device 515b, to the seed trench, as opposed to the conventional air/gas medium, a farmer can reduce dust and bathe the seed in a protective fluid, accelerate germination by using a warm fluid (e.g., water) to heat the seeds, and/or apply a mixture of chemicals just before sowing (e.g., nicanoid, super absorbent polymer, etc.). In some embodiments, the liquid medium carries the seed from a conventional (e.g., dry) seed meter exit down to the seed trench, the seed only being exposed to the liquid medium upon exiting the seed meter. In some embodiments this liquid medium can include fluids from the liquid tank 502. In addition, the consistency of flow provided by a liquid medium improves spacing accuracy by reducing bouncing caused by gravity and rough field conditions as the seed travels down the seed path 1704 of the seeding device 515b, which improves seeding reliability for the entire process.

In some embodiments, the liquid used to form the liquid jet dispensed by a cutting head 508 in the coulter system 514 is heated and/or mixed with an additive that provides a heated seed trench in advance of seed deposition by the seeding device 515b. This promotes germination for the subsequent seed deposition by the seeding device 515b. In some embodiments, a thermal transfer system (not shown) is disposed on and fluidly connected to the liquid jet coulter system 514. The thermal transfer system is configured to harness excess heat generated by the liquid jet pump 504, the mobile unit 512 and/or the optional intensifiers 506 and convey the heat to at least one of the agricultural input (e.g., fertilizer) in the input system 530, the liquid seed medium drawn from the liquid tank 502, the liquid jet formed by the cutting heads 508, and/or the liquid and seed conveyance by the seeding device 515b. Further, the seed sources 540 can be heated to hasten seed germination. In some embodiments, seeds are heated by a warmed liquid introduced into the seed sources 540, where the warmed liquid can be in turn heated by the excess heat harnessed from the pump 504. The resulting heated seed is metered from the seed sources 540 and processed through a liquid seed transfer system of the seeding device 515b as described above.

Figure 9:
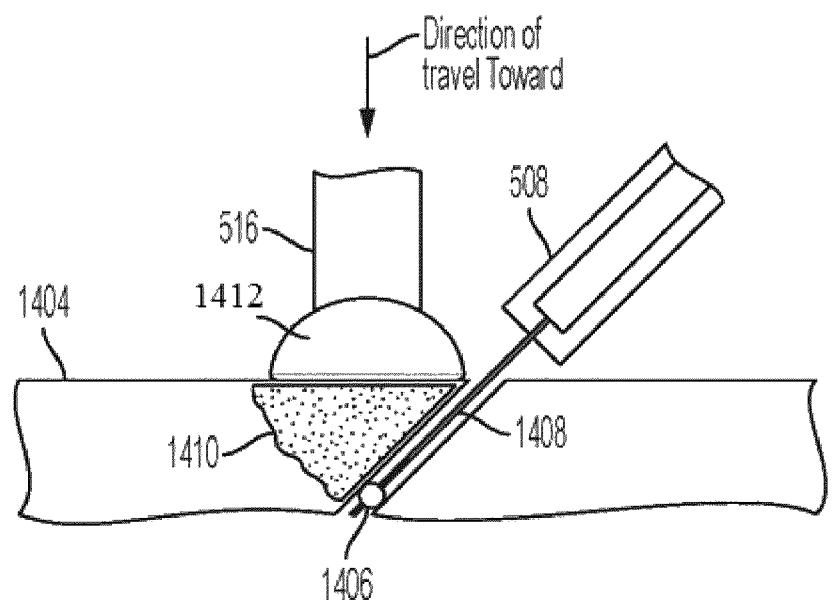
FIG. 9 shows an exemplary configuration of the closing device of the planter of FIG. 5a that can be utilized to close a trench, according to some embodiments of the present invention.

FIG. 9 shows an exemplary configuration of the closing device 516 of the planter system 500 of FIG. 5a that can be utilized to close a trench, such as a normal perpendicular seed trench and/or an angled seed trench 1408 as illustrated in FIG. 9, according to some embodiments of the present invention. The angled trench 1408 is generated by locating nozzle of the liquid jet cutting head at an angle relative to the lateral axis 518 of the mobile unit 512 (e.g., laterally out or inward). This orientation allows for opening of a trench and deposition of a seed 1406 at an angle (e.g., between about 10 and about 85 degrees). This side planting and angled seed placement permits virgin/non-smeared/non-compacted soil to be directly above the seed, the advantage of which will be described in detail below. As shown, the closing device 516 includes a ski 1412 for closing a trench. The ski 1412 may not be rigidly fixed to the planter 500 so that the ski 1412 is free to follow the surface 1404 of the ground without setting/driving the height of the entire planter 500 and/or related implements (e.g., seeder, cutting head, etc.). In contrast, if the closing device 516 is rigidly tied to the planter 500, the depth is less precise and the entire planter 500 may float across the ground due to any difference in height between the closing device 516 and the rest of the planter system 500. In some embodiments, ground engagement of the closing device 516 is set by a gauge wheel (not shown), which can ride along the surface 1404 of the soil and determine the depth of the trench 1408 created by the opening devices of the planter 500. In some embodiments, the liquid jet coulter system 514 and the gauge wheel of the closing device 516 do not affect the depth of a trench 1408 and therefore the depth that a seed 1406 is placed within the trench 1408. Instead, the additional opening device(s) 515a are configured to set both the width and depth of the seed trench 1408. In some embodiments, the gauge wheel of the closing device 516 and the discs of the additional opening device(s) 515a are arranged relative to each other with an offset that is about equal to the depth of seed placement in the trench 1408.

Figure 10:
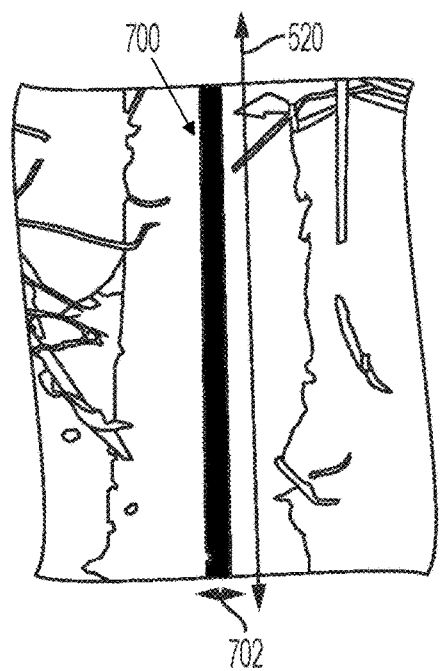
FIG. 10 shows an exemplary trench generated by the liquid jet coulter system of FIG. 5a, according to some embodiments of the present invention.

As described above, each cutting head 508 of the coulter system 514 is adapted to generate a liquid jet that slices through soil, residue, root crowns, and root mass to create a seed trench. FIG. 10 shows an exemplary trench 700 generated by the liquid jet coulter system 514 of FIGS. 5a and 5b, according to some embodiments of the present invention. The seed trench 700 is adapted to extend along the direction of movement of the planter 500, which is substantially along the longitudinal axis 520. Specifically, the liquid jet coulter system 514 is adapted to create the narrow and precise cut 700 through the soil immediately before the additional opening device(s) 515a and the seeding device 515b pass through, substantially freeing them from entangling residue and debris. Thus, a liquid jet cutting head 508 functions as a liquid jet coulter to cut the residue, stubble, root crowns, root mass and soil ahead of processing by the additional opening device(s) 515a and the seeding device 515b. In some embodiments, the trench 700 created by the liquid jet in the soil is between about 0.02 inches and 0.09 inches in initial width 702, such as about 0.04 inches in width 702. A final width of the trench post keel can be between about 0.1 inch to about 1 inch, such as about 0.5 inch, depending on seed crop size and demands. In some embodiments, the depth of the trench 700 measured from the soil surface is controlled by one or more factors including the jet pressure, jet angularity, jet motion, jet speed, etc. This depth may be important if additives are being applied by the liquid jet, as described in detail below. For example, an additive may need to be injected beyond the depth at which the seed is ultimately placed to intercept any growing roots at that depth and/or prevent damage to the seed.

In some embodiments, the liquid jet dispensed by each cutting head 508 has a contact point with the surface of the soil/residue that is as close as possible to the additional opening device 515a to optimize pathing while turning by the planter 500. For example, the spacing between a liquid jet cutting head 508 of the coulter system 514 and an additional opening device 515a can be no more than about 6 inches, such as about 1 inch or less. This is because the further they are apart from each other, the more the initial cut by the coulter system 514 and the further processing by the additional opening device 515a are out of line in a turn. In some embodiments, the leading edge (i.e., the distal edge) of the additional opening device 515a, such as a keel, is substantially aligned with the liquid jet from the cutting head 508 in the longitudinal direction 520 such that residue materials that fail to be cut instantaneously by the cutting head 508 are caught by the leading edge of the keel 515a, where the jet is still focused and the material is severed in short order. In some embodiments, if the liquid jet cannot be in line with the leading edge of the keel 515a, yet another opening device (e.g., a second keel) is placed proximal to the first keel 515a, such as on the closing device 516.

Figure 11A:
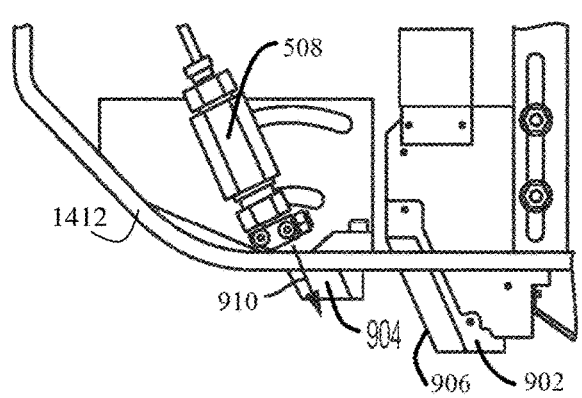
FIGS. 11a and 11b illustrate exemplary arrangements of multiple additional opening devices of the planter of FIG. 5a, according to some embodiments of the present invention.
Figure 11B:
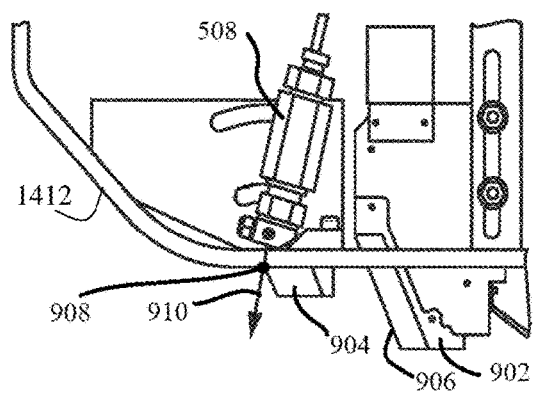

FIGS. 11a and 11b illustrate exemplary arrangements of multiple additional opening devices 515a of the planter 500 of FIG. 5a, according to some embodiments of the present invention. As shown, the additional opening devices 515a include a first additional opening device 904, such as in the form of a keel, located close to the liquid jet cutting head 508 of the coulter system 514 in a manner described above. The additional opening devices 515a can include a second additional opening device 902, which can also be in the form of a keel, attached to the closing device 516 (not shown in FIGS. 11a and 11b, except for a portion of the ski 1412). In the embodiment of FIG. 11a, the liquid jet 910 dispensed by the cutting head 508 is longitudinally aligned with (i.e., substantially parallel to) the leading edge 906 (i.e., the distal edge) of the second keel 902 such that any material that was not initially severed by the cutting head 508 or by the first additional opening device 904 is held in place by the second keel 902 while the cutting head 508 performs the cutting action, thereby preventing the material from accumulating and dragging. Alternatively, as shown in the embodiment of FIG. 11b, the liquid jet 910 dispensed by the cutting head 508 is not longitudinally aligned with the leading edge 906 of the second keel 902, but diverges at a pivot point 908 with respect to the leading edge 906. The arrangement of FIG. 11b can also be used to cut residue materials in a similar fashion as the arrangement of FIG. 11a. An operator can choose either configuration depending on the type of the residue materials present and/or whether more adjustment of the liquid jet cutting head 508 is desired. Specifically, the embodiment of FIG. 11b permits more adjustment/movement of the liquid jet cutting head 508 to create trenches of different angles in response to, for example, different operating conditions, soil or environment conditions (e.g., ground undulations), etc., which is described in detail below with respect to FIG. 17.

In some embodiments, at least one of the additional opening device(s) 515a is a liquid jet cutting head that is in addition to the liquid jet cutting head 508 of the coulter system 514. This additional liquid jet can follow a preceding keel to break up smearing of the soil. In some embodiments the nozzle exit for the additional liquid jet is located below ground level/the surface of the soil in the trench formed by the first liquid jet. For example, this additional liquid jet can be configured to impact the sides of a trench and/or bottom of the trench and can dispense a broader, more dispersed jet of liquid (e.g., fan shaped, irregularly shaped, oscillating, etc.), agricultural inputs, and/or a mixture of high-pressure liquid and inputs. In some embodiments, two or more additional opening devices 515a are configured as liquid jet cutting heads for dispensing liquid jets.

In another aspect of the present invention, the liquid jet cutting heads 508 of the liquid jet coulter system 514 of FIG. 5a are designed, arranged and optimized to provide coulter functions as well as optionally agricultural input conveyance functions. These features of the liquid jet cutting heads 508 are described below in detail.

Figure 12A:
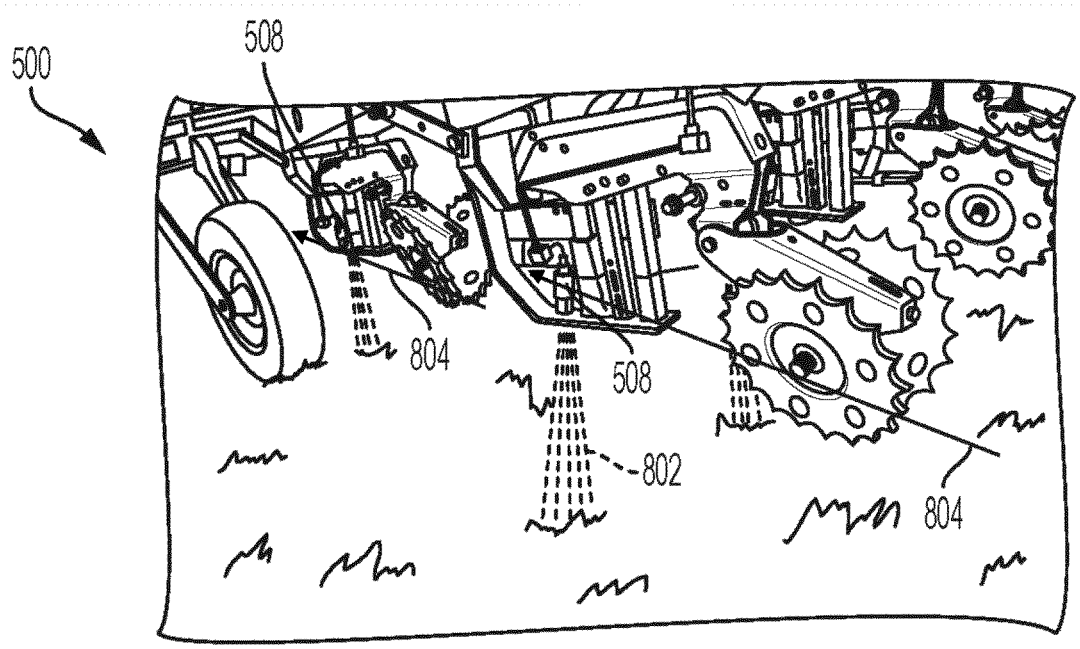
FIGS. 12a and 12b show an exemplary configuration and a block diagram, respectively, of a portion of the planter of FIG. 5a elevated to better illustrate the cutting heads of the liquid jet coulter system, according to some embodiments of the present invention.
Figure 12B:
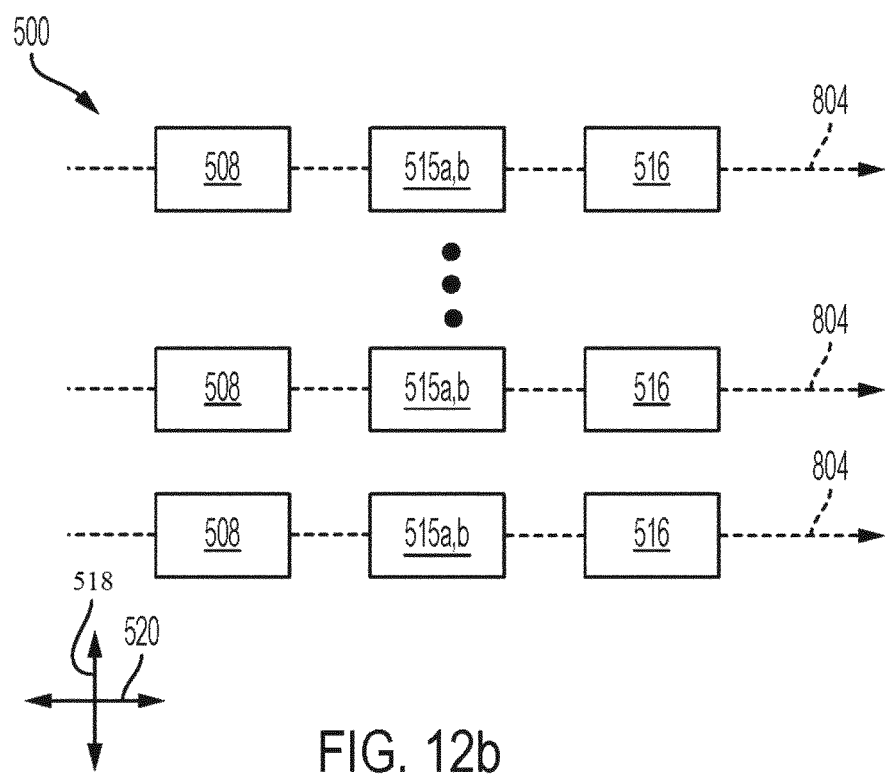

FIGS. 12a and 12b show an exemplary configuration and a block diagram, respectively, of a portion of the planter 500 of FIG. 5a elevated to better illustrate the cutting heads 508 of the liquid jet coulter system 514, according to some embodiments of the present invention. Each cutting head 508 is configured to spray a liquid jet 802 (but shown in FIG. 12a at a non-optimal level from the surface of the soil because the planter portion 500 is elevated for the purpose of illustration). FIGS. 12a and 12b also show that the planter 500 can have multiple liquid jet cutting heads 508 arranged to form multiple trenches (e.g., seed rows) in the soil from one pass of the planter 500. For example, the multiple liquid jet cutting heads 508 can be arranged in multiple rows 804 spaced/staggered along the lateral direction 518 over the soil surface perpendicular to the longitudinal direction 520 of travel, with each row extending along the longitudinal direction 520. Specifically, as shown in FIGS. 12a and 12b, each of the multiple liquid jet cutting heads 508 is part of a row seeding system that comprises a liquid jet cutting head 508, at least one additional opening device 515a, a seeding device 515b, and a closing device 516 all disposed on one row flange 804 of the planter 500 along the longitudinal direction 520. Each liquid jet cutting head 508 can be located a spaced distance distal to the additional opening device 515a, the seeding device 515b, and the closing device 516 along the longitudinal direction 520. In the lateral direction 518, the desired spacing between the liquid jet heads 508 across the rows is determined by the given crop being planted. In some embodiments, liquid jet cutting heads 508 are staggered (e.g., longitudinally spaced) across the rows offset relative to one another in at least one of the longitudinal direction 520 and the lateral direction 518. Staggered jets allow for adjacent rows 804 to be planted in an offset or uniform pattern without requiring each row to be seeded simultaneously, which can lead to more consistent/dispersed pump demands as the pump(s) 504 and/or intensifier(s) 506 don't all need to pulse at once. Staggering also allows for more narrow spacing among the rows.

In some embodiments, the multiple liquid jet cutting heads 508 of the coulter system 514 of the planter 500 are used for more than just cutting the residue and creating an accurate and consistent initial seed trench. The coulter system 514 can be adapted to also introduce inputs into the soil, such as to areas proximate to the deposited seeds. As an example, the coulter system 514 can include at least two liquid jet cutting heads 508a, 508b arranged in two rows as described above with respect to FIGS. 12a and 12b, where each cutting head forms a trench 700a, 700b as described above with respect to FIG. 10. The trench 700a formed by the first cutting head 508a is configured to receive deposition of seeds at periodic intervals by a seeding device 515b coupled to the same row flange as the first liquid jet cutting head 508a. Thus the seeds are deposited periodically by the seeding device 515b into the trench 700a along the longitudinal axis 502 after the first cutting head 508*a* creates the trench 700*a* and the additional opening device(s) 515*a* further forms/shapes the trench 700*a*. The second liquid jet cutting head 508*b*, which is positioned adjacent to the first cutting head 508*a*, is configured to create a liquid jet that incorporates an agricultural input and deposits the input into a corresponding trench 700*b* that is adjacent and substantially proximate to the first trench 700*a*. The second liquid jet cutting head 508*b* can receive the input from the input system 530 (illustrated in FIG. 5*a*). In some embodiments, the second liquid jet cutting head 508*b* is staggered relative to the first cutting head 508*b* as described above with reference to FIGS. 12*a* and 12*b*, such that it is offset relative to the first cutting head 508*b* in at least one of the longitudinal direction 520 or the lateral direction 518.

Figure 24A:
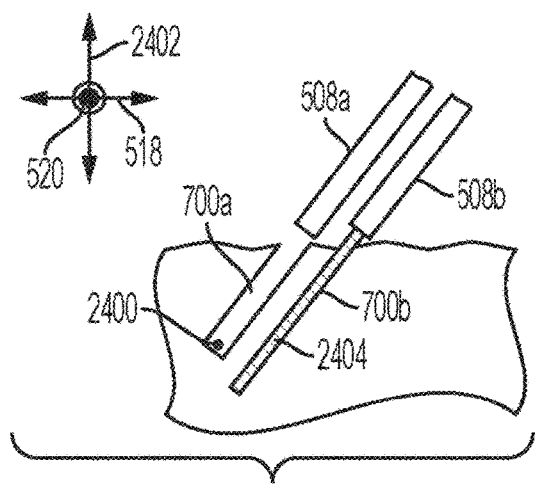
FIGS. 24a and 24b show additional exemplary trench formations by two liquid jet cutting heads of the planter of FIG. 5a, according to some embodiments of the present invention.
Figure 24B:
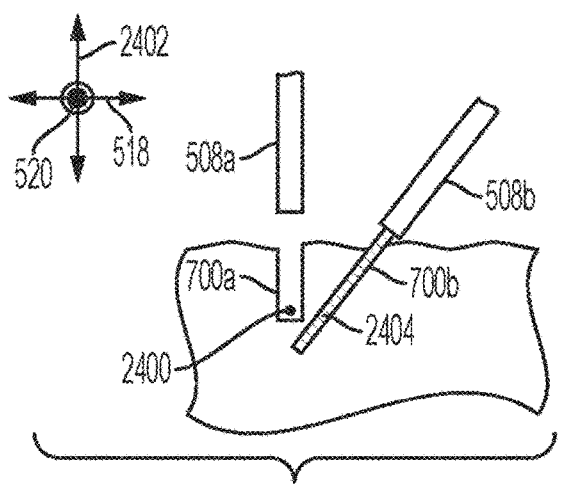

In some embodiments, the two trenches 700*a*, 700*b* are proximate to each other so that the agricultural input deposited by the second cutting head 508*b* in the second trench 700*b* is sufficiently close to the seeds deposited in the first trench 700*a* to nourish the seeds. Some embodiments may including an arrangement for what is commonly referred to as "side dressing," where the seed and input are typically parallel but offset (e.g., 2 inches over 2 inches down). Such an arrangement can be accomplished via the input precision capabilities of the ultra-high pressure planter system 500 discussed herein. For example, a fertilizer introduced by the second cutting head 508*b* can be located adjacent and/or in the second trench 700*b* close to (i) the depth of the seeds in the first trench 700*a* or (ii) below the depth of the seeds in the first trench 700*a* so as to decrease the likelihood of burning the seeds and/or decrease the amount of fertilizer that needs to be injected into the sub-soil (e.g., as a result of the fertilizer location accuracy). FIGS. 24*a* and 24*b* show exemplary trench formations 700*a*, 700*b* by two liquid jet cutting heads 508*a*, 508*b* of the planter of FIG. 5*a*, according to some embodiments of the present invention. In some embodiments of side dressing, as shown in FIG. 24*a*, the seed trench 700*a*, which is configured to receive a seed 2400, is formed by the first liquid jet cutting head 508*a* at an angle relative to the lateral axis 518 and a vertical axis 2402. The vertical axis 2404 is defined as perpendicular to both the longitudinal axis 520 along which the planter 500 travels and the lateral axis 518 along which the row flanges 804 of the planter 500 are staggered. The input trench 700*b*, which is configured to receive an agricultural input 2404, is formed by the second liquid jet cutting head 508*b* at about the same angle as the seed trench 700*a*. Thus, the two trenches 700*a*, 700*b* can be substantially parallel to each other at about the same angle while proximate to each other, but without intersecting each other. In some embodiments, as shown in FIG. 24*b*, the seed trench 700*a* is formed by the first liquid jet cutting head 508*a* to be substantially parallel to the vertical axis 2402, i.e., normal to the soil surface defined by the longitudinal axis 520 and the lateral axis 518. The input trench 700*b* is formed by the second liquid jet cutting head 508*b* at an angle with the soil to locate the agricultural input 2404 at a user-controllable distance below the soil surface and proximate (e.g., beside and/or below) the seed 2400. Specifically, the angle of the input trench 700*b* is user controllable such that the input 2404 can be delivered above, below or at the depth of the seed 2400. In alternative embodiments, the seed 2400 is injected at an angle while the input 2404 is delivered in a normal direction relative to the soil surface. In general, the trenches 700*a* and 700*b* can be formed at any angle below the soil surface, either intersecting or non-intersecting (but proximate relative to each other). By locating the agricultural inputs and/or seed below the soil surface using the ultra-high pressure planter system 500, runoff is significantly reduced (e.g., eliminated).

The agricultural input provided to the second cutting head 508*b* by the input system 530 can be a liquid, solid or gaseous substance. For example, the input is one or more of lime, fertilizer, pesticide, etc. In some embodiments, the input is one or more of a fungicide, an insecticide, a beneficial mineral, or another agricultural additive. In some embodiments, the liquid used to create the liquid jet of the second cutting head 508*b* includes mostly a fertilizer, such as a water and fertilizer mixture or a liquid fertilizer.

Figure 13:
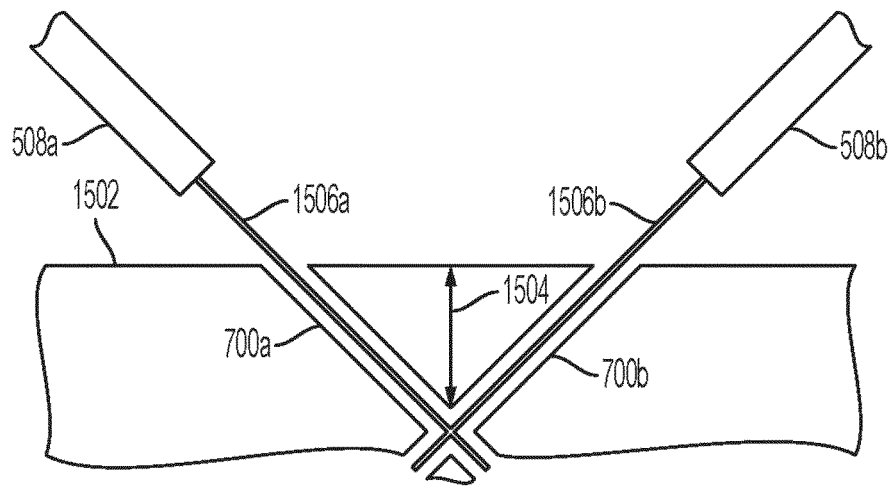
FIG. 13 shows exemplary trench formations by two liquid jet cutting heads of the planter of FIG. 5a, according to some embodiments of the present invention.

FIG. 13 shows additional exemplary trench formations by two liquid jet cutting heads 508*a*, 508*b* of the planter 500 of FIG. 5*a*, according to some embodiments of the present invention. The first liquid jet cutting head 508*a* and the second liquid jet cutting head 508*b* are configured to open respective trenches 700*a*, 700*b*, where each trench can be used for either seed deposition or input deposition. For example, the first trench 700*a* is configured to receive a seed and the second trench 700*b* is configured to receive an agricultural input. Because each cutting head 508*a*, *b* can be adjusted to orient at a non-normal angle with respect to the surface 1502 of the soil, which will be described below, the resulting trenches 700*a*, *b* may intersect at a specific depth and/or terminate substantially proximate to one another without intersecting so as to achieve desired seed and input spacing. In the embodiment of FIG. 13, the liquid jets 1506*a*, 1506*b* delivered by the first and second cutting heads 508*a*, *b* intersect with one another at a desired depth 1504 so as to eliminate the need for a closing device, such as the closing device 516. This intersection of liquid jets 1506*a* and 1506*b* can cause severed virgin soil to freely collapse on the seed and/or the input. In addition, this configuration can significantly reduce the requisite closing force that needs to be applied to the trenches 700*a*, *b*, thereby reducing the smear effect produced by a closing device.

In some embodiments, a third liquid jet cutting head (not shown) is used to periodically transect the dual trenches 700*a*, *b* to promote soil collapse on the deposits (e.g., seed and input). Thus, the third liquid jet cutting head functions as a closing device. In some embodiments, the multiple liquid jet cutting heads 508 of the coulter system 514 are arranged in one or more of a stacked configuration, an offset configuration, and/or an angled orientation to intersect at about the same point or close to each other on the soil surface or at a specific depth below.

Figure 14:
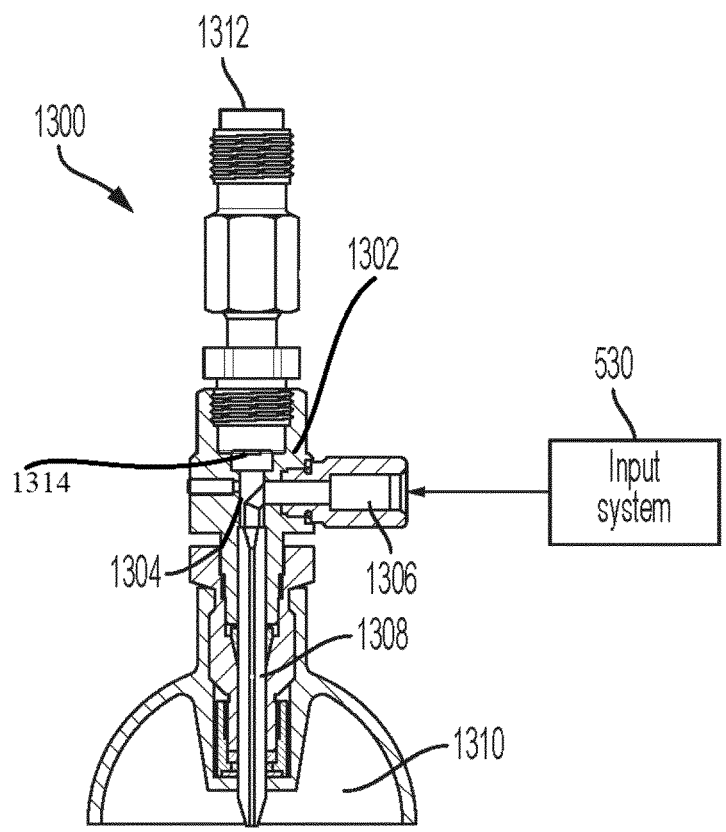
FIG. 14 illustrates an exemplary configuration of the liquid jet cutting head of the liquid jet coulter system of FIG. 5a, according to some embodiments of the present invention.
Figure 15:
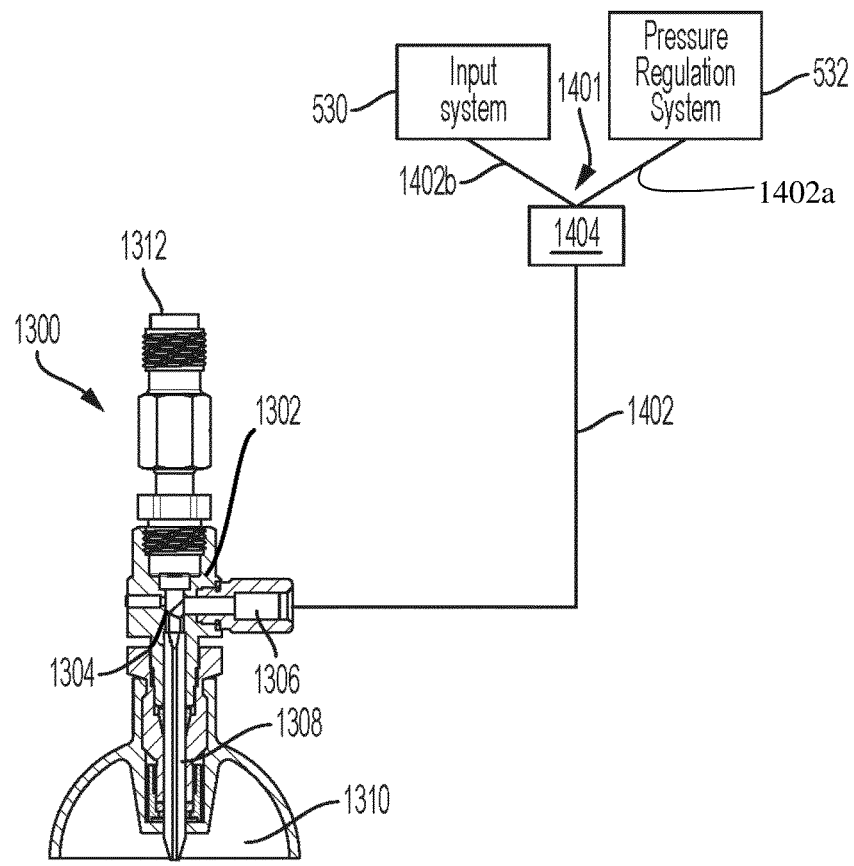
FIG. 15 shows an exemplary configuration of a set of fluid connection lines coupled to the liquid jet cutting head of FIG. 14 to minimize occurrences of malfunctions and/or alert an operator to the malfunctions, according to some embodiments of the present invention.

FIG. 14 illustrates an exemplary configuration 1300 of the liquid jet cutting head 508 of the liquid jet coulter system 514 of FIG. 5*a*, according to some embodiments of the present invention. Generally, the liquid jet cutting head 1300 of FIG. 13 can be an abrasive style cutting head that includes a body 1302 defining a mixing chamber 1304 configured to receive an ultra high-pressure liquid from the pump 504 and the optional intensifier 506 via the ultra high-pressure lines 510. The ultra high-pressure liquid can enter the cutting head 1300 via a liquid supply port 1312 that is in fluid connection with the mixing chamber 1304. More specifically, the cutting head 1300 includes an orifice 1314 for receiving the ultra high pressure liquid via the liquid supply port 1312 and allowing the liquid to enter the mixing chamber 1304 at supersonic speed. The mixing chamber 1304 is also adapted to receive an agricultural input from an input system (such as the input system 530 illustrated in FIG. 5*a*) that is fluidly connected to the mixing chamber 1304 of the cutting head 1300 via a set of one or more ports 1306. The mixing chamber 1304 is adapted to mix the ultra high pressure liquid with the agricultural input. The cutting head 1300 further includes a nozzle 1308 disposed in the body 1302 and fluidly connected to the mixing chamber 1304. The nozzle 1308 is shaped to convey the mixture of the agricultural input and the ultra high-pressure liquid into the soil in the form of a liquid jet. The nozzle 1308 can function as a mixing tube by providing an elongated space for the liquid and abrasive input to mix prior to delivery to the soil. In some embodiments, a distal tip of the nozzle 1308 of a second liquid jet cutting head is placed below the surface level of the soil during operation if, for example, the liquid jet is used to inject an agricultural input after a first liquid jet cutting head has passed to sever the residue and open the soil and/or the seeding trench has already been created. Optionally, a nozzle guard 1310 can be coupled to the nozzle 1308 for protection against collisions, contamination and debris. The nozzle guard 1310 can also physically shroud a seed during input so that the seed is not directly exposed to environment and/or to treat only the nearby soil. In some embodiments, the nozzle guard 1310 is further configured to contact and compress residue just in advance of the liquid jet, thereby making it easier to cut using the liquid jet cutting head.

For the cutting head 1300, a ratio of a diameter of the nozzle 1308 and the orifice size of the orifice 1314 of the cutting head 1300 may be skewed heavily as a result of the relatively large nozzle 1308 in comparison to the relatively small orifice size. For example, a ratio of the diameter of the nozzle 1308 to the diameter of the orifice 1314 can be greater than 2, such as about 12 or about 20. In some embodiments, the size and/or shape of the orifice 1314 is different from those of conventional liquid jet cutting heads. The different shapes can be, for example, oval shaped, horseshoe shaped, tear-drop shaped, rectangular shaped, etc. In some embodiments, different sizes/shapes of the orifice 1314 can be used to set different widths of the trench.

In general, the input system 530 can supply solid, liquid or gaseous inputs to the mixing chamber 1304 via the set of ports 1306. For example, the set of ports 1306 can be configured to introduce and deposit desired solid-state particles (e.g., limestone, potash, granular fertilizer, etc.) into the ultra high-pressure liquid for mixing in the mixing chamber 1304. Introduction of these inputs are adapted to perform at least one of: keep mold and other destructive elements away from the seed pre-germination and during early stages of seed development, prevent seed rot, and absorb and/or retain moisture proximate to the seed trench. These substances can be introduced to the mixing chamber 1304 continuously or periodically/selectively via dosing into the liquid jet after the jet is formed using the ultra high-pressure liquid. Dosing can be accomplished by selectively applying a certain amount of metered inputs into the liquid jet stream. In some embodiments, gaseous substances are introduced into the liquid jet stream from the input system 530 via the one or more ports 1306.

Agricultural inputs received by the cutting head 1300 via the one or more ports 1306 can be mixed into the liquid jet before, after or during jet formation. For example, the agricultural input can be a granular fertilizer that is introduced to the liquid jet after the liquid jet is formed in the mixing chamber 1304. This type of post jet formation introduction promotes fracturing/particlization of the fertilizer grains and thorough integration into the jet stream for even dispersal throughout the corresponding trench. As yet another example, the agricultural input can be a granular fertilizer that is injected prior to jet formation and is adapted to follow the liquid jet to "push" or "blast" these granular products into the soil. In some embodiments, the granular fertilizer is passed/fed through gears of a gear pump to powderize the fertilizer prior to introduction to the liquid jet.

Due to the multitude of pressure variances, densities, mixture of liquids, solids, gases, and vacuums that are generated and cycled through the coulter system 514 during a seeding process, a malfunction can occur within the coulter system 514 if one of the input supply lines is clogged and/or reversed. Exemplary malfunctions can be one or more components of the coulter system 514 stop working, creating improper flow, and/or becoming jammed. FIG. 15 shows an exemplary configuration of a set of fluid connection lines coupled to the cutting head 1300 of FIG. 14 to minimize occurrences of malfunctions and/or alert an operator to the malfunctions, according to some embodiments of the present invention. As shown, at least one port 1306 of the cutting head 1300 is connected to a line 1402 that is bifurcated upstream at a junction 1401 between a vent line 1402a and an input supply line 1402b. The vent line 1402a is connected to a pressure regulation system (such as the pressure regulation system 532 illustrated in FIG. 5a) that is located distant relative to the tip of the nozzle 1308 of the cutting head 1300 and on the far end of the vent line 1402a. The input supply line 1402b is connected to the agricultural input system 530 configured to supply an agricultural input (e.g., a fertilizer) to the cutting head 1300 as described above with reference to FIG. 14.

In some embodiments, the pressure regulation system 532 is an air filter 532, such as a filter box that provides filtered air to the vent line 1402a. In some embodiments, the pressure regulation system 532 is a snorkel line adapted to vent to atmosphere, and the snorkel line is located distant from the interface of the cutting head with the soil, which is the primary generation area of foreign debris (e.g., dust, dirt, plant residue, etc.). That is, the pressure regulation system 532 is not connected to a source of filtered air or a filter, but rather exposes the vent line 1402a to atmosphere such that fresh air is delivered to the cutting heading 508 in a manner that diminishes clogs and jams. In some embodiments, the pressure regulation system 532 provides a compressed fluid at a much lower pressure than the liquid jet into the mixing chamber 1304 of the cutting head 1300 to create a positive pressure in the mixing chamber 1304, thereby preventing the foreign debris from entering the mixing chamber 1304 (e.g., during a corner operation, while seeding is not taking place, while the system is not cutting, etc.), essentially flushing the mixing chamber 1304. In some embodiments, the positive pressure negates any vacuum created by the orifice 1314, which in turn prevents intake of debris up from the exit orifice of the nozzle 1308, as well as preventing the resulting damage/adhesion to the orifice 1314 that can eventually become plugged without the positive pressure. In some embodiments, the vent line 1402a includes an air flow sensor (not shown) or a vacuum sensor (shown) to monitor system condition and performance.

In general, the pressure regulation system 532 combined with the separate vent line 1402a serve to limit and/or eliminate the amount of the foreign debris that can be absorbed back into the coulter system 514 from the nozzle 1308 of the cutting head 1300 during normal processing, such as during a cycle event and/or a stop or malfunction event. The design of FIG. 15 also solves a common problem of the input supply line 1402b being backed up into the system when the liquid jet is turned off (e.g., to make a turn, take a break, when nozzle plugs, etc.). Thus, the pressure regulation system 532 combined with the separate vent line 1402a prevent system contamination and/or back pressure of the input supply line 1402b.

In some embodiments, the junction 1401 between the vent line 1402a and the input supply line 1402b includes a one-way valve 1404 configured to force any back pressure from the cutting head 1300 out the vent line 1402a, thereby protecting the input supply line 1402b.

In some embodiments, the vent line 1402a includes a backward whistle (not shown) that is configured to audibly alert an operator to an issue, such as dirt coming into nozzle orifices, nozzles sucking in dirt, etc. The whistle is adapted to generate an alert sound when air is sent through the vent line 1402a in a backward direction. As an example of this reverse whistle, if a nozzle orifice is blown or plugged, the snorkel line of the pressure regulation system 532 is adapted to run backwards and scream if air is flowing the wrong direction, i.e., upstream. The alert is helpful to an operator when he/she cannot determine which component is not working but would like to be made aware of a general issue.

In alternative embodiments, instead of creating the bifurcated vent line 1402a, another port (not shown) is located in the cutting head 1300 to receive a metered source of compressed air/gas, thereby directly placing a positive pressure on the mixing chamber 1304 to limit the amount of foreign debris that can enter the cutting head 1300 via the nozzle 1308.

Figure 16:
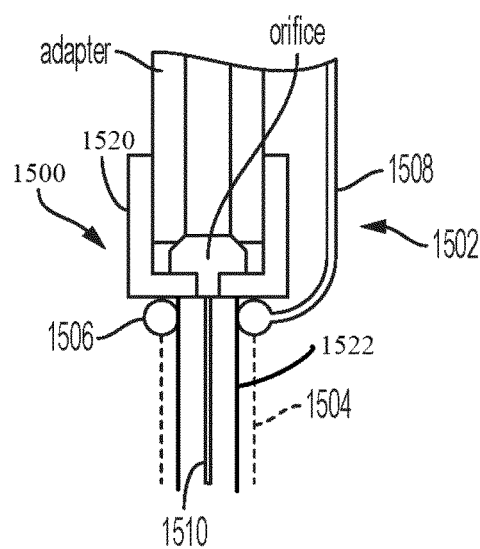
FIG. 16 shows an exemplary configuration of a liquid jet cutting head of the coulter system of FIG. 5a configured to generate a fluid shroud, according to some embodiments of the present invention.

In some embodiments, a fluid shield/shroud is formed by a cutting head 508 to substantially surround the liquid jet as it emerges from the nozzle of the cutting head. FIG. 16 shows an exemplary configuration of a liquid jet cutting head 508 of the coulter system 514 of FIG. 5a configured to generate a fluid shroud, according to some embodiments of the present invention. As shown, the cutting head configuration of FIG. 16 includes a cutting head 1500 and a shroud system 1502 connected to an orifice nut 1520 of the cutting head 1500. Even though FIG. 16 illustrates the cutting head 1500 as a water-only cutting head, a person of ordinary skill understands that the abrasive cutting head 1300 of FIGS. 14 and 15 can be easily adapted to incorporate a similar shroud system. In general, either an abrasive-type cutting head assembly or a water-only type cutting head assembly can be used as the liquid jet cutting head 508 of the coulter system 514 of the present invention, as either configuration allows fluid pressure to be transferred to velocity to cut surface residue and/or open soil.

The shroud system 1502 can be integrated with the orifice nut 1520 or removably attached to the orifice nut 1520. As shown, the shroud system 1502 includes (i) a supply ring 1506 circumferentially attached to an external surface of the orifice nut 1520 and (ii) a liquid shroud supply line 1508 in fluid communication with the ring 1506. More specifically, the liquid shroud supply line 1508 is connected between the supply ring 1506 and an input system of the planter 500, such as the input system 530 illustrated in FIG. 5a to provide a fluid medium to the ring 1506 to form a shroud 1504. The ring 1506 is suitably configured to dispense the fluid medium as a shield/shroud around a liquid jet 1510 that is dispensed by the nozzle 1522 of the cutting head 1500. The shroud 1504 can be formed between a tip of the nozzle 1522 and a surface of the soil being processed. For example, the ring 1506 can have perforated holes at regular intervals around a circumference of the nozzle 1522 for even shroud formation. The fluid shroud 1504 can be dispensed as a mist and/or a curtain of liquid. In some embodiments, the fluid medium of the shroud system 1502 is at least one of a liquid, a fertilizer, a gas, or water.

The shroud 1504 can be used to pretreat a seed trench prior to seed deposition, such as introducing the proper amount of moisture to the soil prior to seed deposition while avoiding flooding the seed trench. In addition, the shroud 1504 can enhance the precise delivery/interaction of the liquid jet 1510 with the soil by preventing the liquid jet 1510 from splattering beyond the perimeter of the shroud 1504. In some embodiments, the shroud 1504 is controlled via an On/Off valve (not shown) that can be either manually or automatically activated, thereby allowing for stitching and activation of the shield 1504 selectively, such as only when a seed is being deposited. Therefore, the shroud 1504 does not need to run continuously. In some embodiments, the shroud 1504 is created in connection with a cutting head 508 that is used to create a trench for seeding. In some embodiments, the shroud 1504 is created in connection with a cutting head 508 used to deliver an input adjacent to the seed trench.

Generally, a liquid jet cutting head 508 can maintain certain orientation relative to the surface of the soil during a processing operation. In some embodiments, a liquid jet cutting head 508 is oriented/pointed substantially perpendicular to the direction of travel and the surface of the soil, thus generating a substantially vertical jet which pierces the soil. In alternative embodiments, the liquid jet cutting head 508 is oriented substantially non-perpendicular to the ground, thereby generating a non-perpendicular cutting angle. For example, the liquid jet cutting head 508 can be oriented substantially in the direction of travel (i.e., along the longitudinal direction 520 illustrated in FIG. 5a) so as to cut through weeds in the oncoming path of travel. In other examples, the liquid jet cutting head 508 can be oriented substantially forward, substantially to the side, substantially at an angle relative to the direction of travel, as such.

In some embodiments, liquid jet angularity relative to the direction of travel by the planter 500 (i.e., along the longitudinal direction) is adjustable to obtain different trench depths. For example, as illustrated above with reference to FIG. 13, the nozzles of multiple cutting heads can be angled toward each other to intersect at a specific depth below the soil. In some embodiments, the angle of a liquid jet can be manipulated from side to side (in the lateral direction 518) as opposed to front and back (in the longitudinal direction 520) to create a slit at some angle that is not in line with the forward longitudinal travel direction of the planter 500. This allows for side dressing of fertilizer or alignment with an angled/flexible seeding device 515b as described above. In operation the seeding device 515b follows the liquid jet cutting head 508 and is configured to deposit seeds within the trench created by the cutting head 508, at a consistent pre-determined depth, before the trench is sealed with the closing device 516 that follows the seeding device 515b.

As described above, a liquid jet cutting head 508 can be oriented at a non-normal angle relative to the surface of the soil to be cultivated, thereby enabling side planting/seeding. The non-normal angle can be between about 1 and about 89 degrees. In some embodiments, the non-normal angle is between about 30 and about 60 degrees. For example, as shown in FIG. 9, the nozzle of the liquid jet cutting head 508 is shown to be oriented at about a 45-degree angle relative to the surface 1404 of the soil, where the orientation is substantially non-co-linear to the direction of travel 520 of the planter 500. In this configuration, an angled seed trench 1408 is created such that once a seed 1406 is placed in the trench 1408 the seed 1406 has only virgin soil 1410 directly above it. By injecting the liquid jet of a cutting head 508 at a user-adjustable angle and applying the additional opening devices 515a (e.g., a keel) at substantially the same angle, the system 500 is able to perform dynamic angle cutting to form the angled trench 1408. The system 500 is also able to close the trench 1408 on top of the seed 1406 with minimized smearing, following the liquid jet and keel application. Having an adjustable/manipulatable liquid jet cutting head 508 allows an operator to control the angle of the liquid jet regardless of the direction and/or motion of the planter 500 itself, thereby allowing control over trench formation, seeding operations, input depth, absolute location below the soil surface and relative location between the seed and input.

In some embodiments, trench depth is adjustable by manipulating the angle of a liquid jet cutting head 508 relative to the direction of travel based on readings from a ground density sensor. This allows the planter system 500 to be tunable, such that adjustments to ground conditions can be made in real time, thereby ensuring consistent seeding and/or input depth. For example, turning the liquid jet cutting head 508, including the cutting head nozzle, more parallel with the ground in the direction of travel results in a shallower trench whereas angling the nozzle more vertically results in a deeper trench. In this manner, the planter 500, including each row of the multi-row coulter system and each liquid jet cutting head in a specific row, can be adjusted and/or can self-adjust to account for ground undulation in order to maintain straighter and/or consistent depth rows. In some embodiments, the angle of a liquid jet is manipulated and/or controlled to control deposition of an agricultural input (e.g., a fertilizer) in the ground dependent upon location, type, seed combination, etc. With this angled technique of fertilizer application and deposition, free sidebanding can be achieved, which is helpful in cases where the fertilizer is too powerful to be proximate to a seed. In general, by angling the liquid jets of the cutting heads 508 to achieve and/or maintain a desired depth, operators and designers are able to avoid using the traditional approach of adjusting system pressures and volumes to control soil depth.

Figure 17:
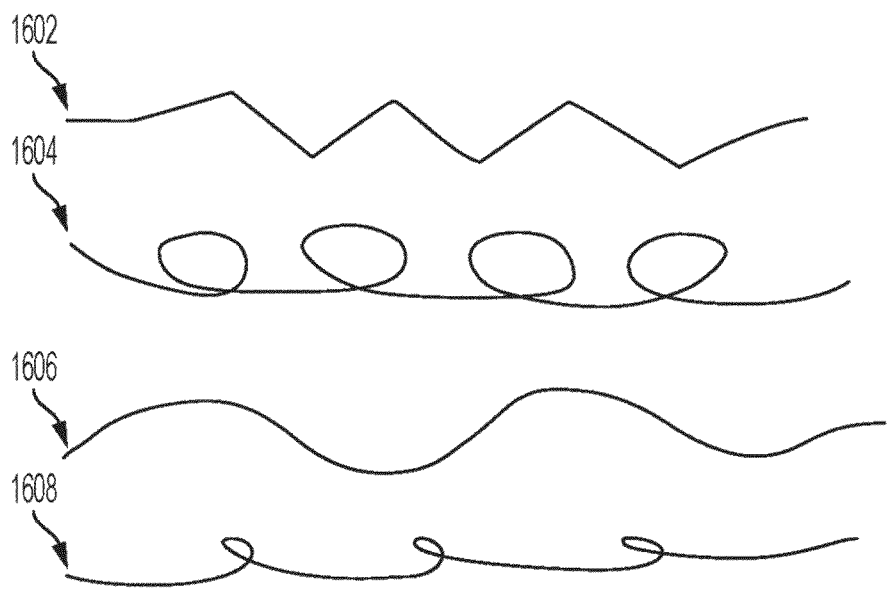
FIG. 17 shows a few exemplary patterns in the soil that can be made by a liquid jet cutting head of the coulter system of FIG. 5a, according to some embodiments of the present invention.

In some embodiments, at least one of the liquid jet cutting heads 508 in the coulter system 514 is configured to dynamically adjust and/or change its position during operation, such as while the planter 500 is traveling across a field. FIG. 17 shows a few exemplary patterns in the soil that can be made by a liquid jet cutting head 508 of the coulter system 514 of FIG. 5a, according to some embodiments of the present invention. Many of these patterns are not attainable by a traditional solid physical coulter. These patterns can be formed in the soil by motioning the liquid jet cutting head 508 relative to the rest of the planter 500 while the planter is translating across the field. As shown, the zig zag pattern 1602 and the sine wave pattern 1604 can be formed by translating the liquid jet cutting head perpendicular to the direction of travel of the planter system along the longitudinal direction 520 (i.e., translating the cutting head in the lateral directions 518). The oscillation patterns 1604, 1608 can be formed by generally circling the liquid jet cutting head 508 as the planter system 500 travels. Specifically, simple oscillation of the liquid jet cutting head can lead to an asymmetric pattern, such as the pattern 1608, because half the time the liquid jet cutting head 508 is traveling in a direction that is co-linear with the direction of travel and half the time it is opposite to the direction of travel. When the liquid jet cutting head 508 is traveling in the same direction of travel as the rest of the planter system 500, it can create a long mostly straight line covering a great distance and when it is traveling opposite to the direction of travel, it can create a much shorter but deeper trench portion. In some embodiments, the speed, revolution-per-minute (RPM), and/or direction of the liquid jet cutting head motion relative to the planter system 500 is adjusted in time to compensate for actual movement of the entire planter system 500, thereby yielding a desired trench/path, such as the more evenly rounded oscillation pattern 1604. In some embodiments, a specially shaped orifice is oriented in the liquid jet cutting head 508 to compensate for the combinative motions between the actual system motion and the liquid jet cutting head motion relative to the system 500. Generally, a liquid jet cutting head 508 is capable of generating any number of trench patterns, shapes and designs while the planter system 500 is translating over a field.

Figure 18:
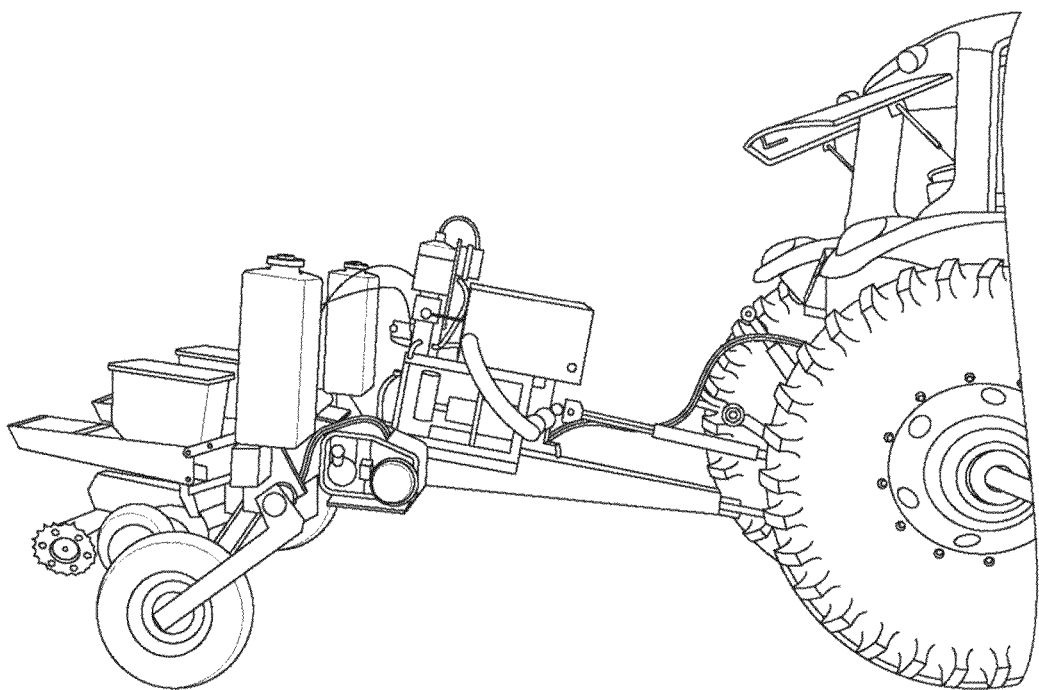
FIG. 18 shows an exemplary configuration of an integrated liquid jet planter disposed on a unitary frame, according to some embodiments of the present invention.

In another aspect, the liquid jet coulter system 514 of FIG. 5a can be fully integrated with, partially integrated with, or separate from other components of the planter system 500. In some embodiments, the liquid jet coulter system 514 is a part of a fully integrated planter 500 that incorporates liquid jet cutting with seeding functions on a unitary frame, as illustrated in FIG. 5b. For example, the planter 500 can include the liquid jet coulter system 514, the one or more additional opening devices 515a, the one or more seeding devices 515b and the one or more closing devices 516 all disposed on the chassis of a multi-row seeder. FIG. 18 shows another exemplary configuration of an integrated liquid jet planter disposed on a unitary frame, according to some embodiments of the present invention.

Figure 19:
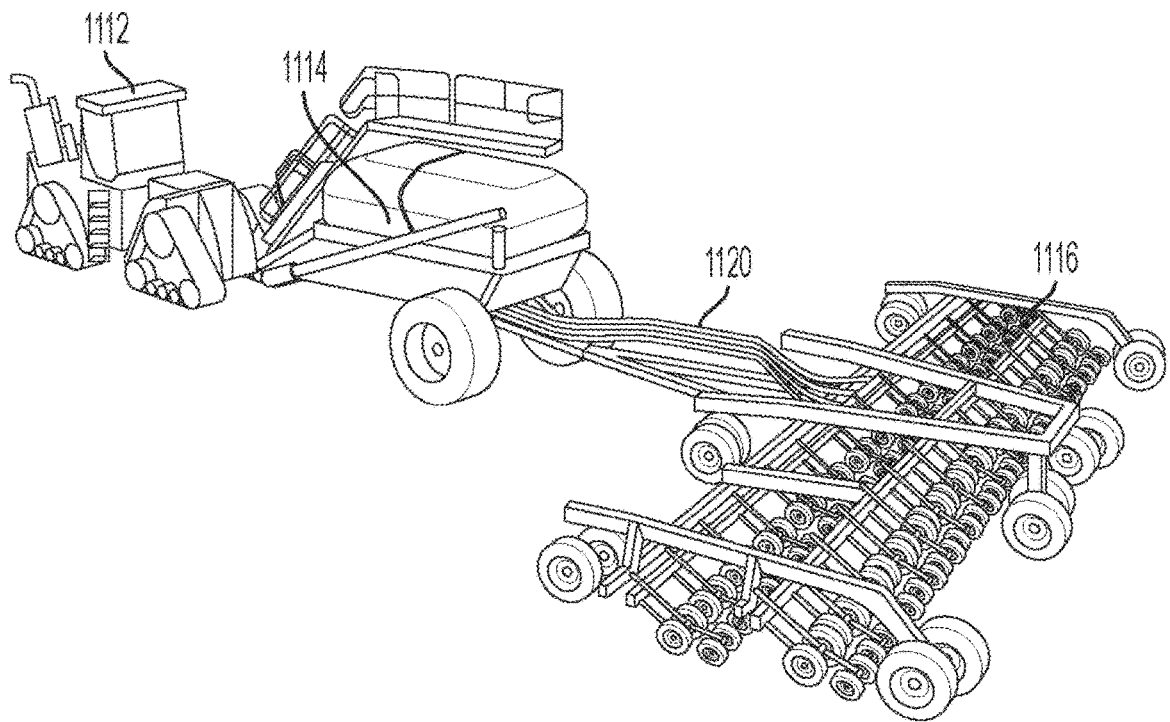
FIG. 19 shows an exemplary distributed configuration of the planter of FIG. 5a, according to some embodiments of the present invention.

In alternative embodiments, the liquid jet coulter system 514 is distributed on different sections of the planter 500 that are detachable from one another. This distributed platform can be used to retrofit existing seeding devices that do not have coulter functions. FIG. 19 shows an exemplary distributed configuration of the planter 500 of FIG. 5a, according to some embodiments of the present invention. As shown, the planter components can be divided among three separable frame sections, including a mobile unit 1112, a middle unit 1114, and a rear unit 1116. The mobile unit 1112, which can be substantially the same as the mobile unit 512 of FIG. 5a, is configured to tow the middle unit 1114 and the rear unit 1116 behind as it advances across a field to be cultivated. In some embodiments, a tow 1120 connects the middle unit 1114 and the rear unit 1116. The middle unit 1114 can be a wagon configured to support a multitude of planter components, including one or more liquid jet coulter components. For example, the middle unit 1114 can support at least one of ancillary control devices and safeties, fertilizer pumps, meters, switches, compressed air pumps, tanks switches, power unit, fresh cleaning water, liquid tanks and optionally pumps and intensifiers, which supply the high-pressure fluid to a plurality of liquid jet cutting heads disposed on the rear unit 1116 that also provides seed dispensing functions. In some embodiments, the intensifiers are disposed on the rear seeding unit 1116 adjacent to the liquid jet cutting heads that are also on the rear unit 1116 and fluidly connected to the middle unit 1114 for supplying the liquid to be pressurized. Overall, one or more components of the liquid jet coulter system 514 can be located remote from the rear seeding unit 1116, but operably connected to the rear seeding unit 1116.

Figure 20:
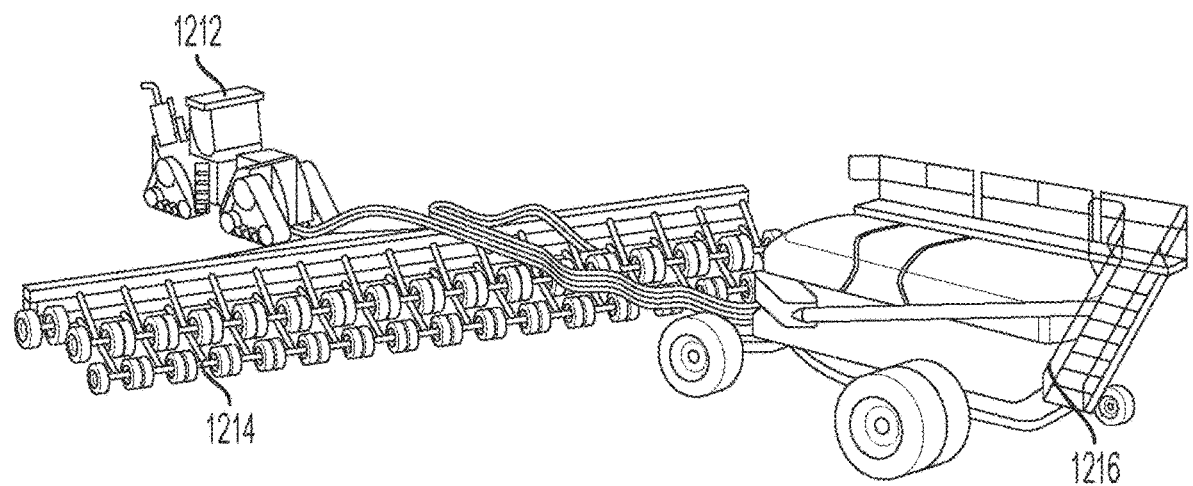
FIG. 20 shows another exemplary distributed configuration of the planter of FIG. 5a, according to some embodiments of the present invention.

FIG. 20 shows another exemplary distributed configuration of the planter 500 of FIG. 5a, according to some embodiments of the present invention. As shown, the planter 500 is also distributed into three frame sections, a mobile unit 1212 that can be substantially the same as the mobile unit 1112 of FIG. 19, a middle unit 1214 that can be substantially the same as the rear seeding unit 1116 of FIG. 19, and a rear unit 1216 that can be substantially the same as the middle unit 1114 of FIG. 19. Further, a tow 1220 is used between the middle unit 1214 and the rear unit 1216 to connect the various components of the planter 500 together during operation. Specifically, the tow 1220 is located behind the liquid jet cutting heads of the middle unit 1214 instead of in front of the liquid jet cutting heads of the rear unit 1116 of FIG. 19. Similar to the embodiment of FIG. 19, the liquid supply and optionally the pumps and/or intensifiers can be disposed on the rear unit 1216, but towed behind the liquid jet cutting heads of the middle unit 1214 to support liquid jet cutting. The arrangement of FIG. 20 can also be used to retrofit an existing planter by replacing the solid physical coulters on its frame. In some embodiments the planter 500 is a hydraulically powered system (e.g., a three-point mounted planter setup with front three-point and/or rear three-point hitch combinations).

Figure 21:
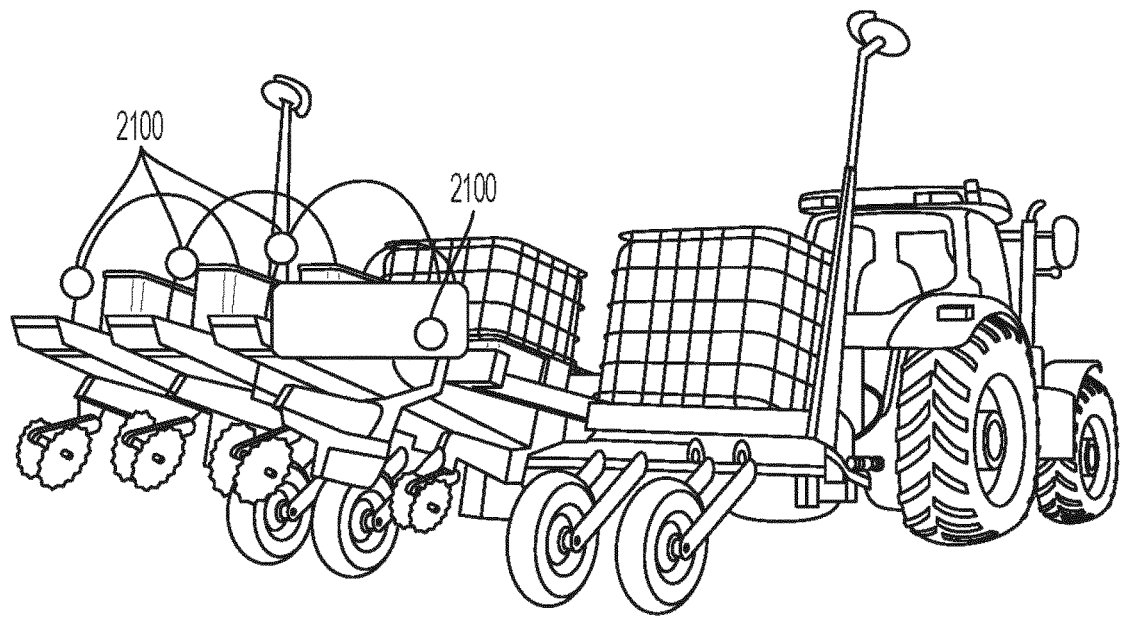
FIG. 21 shows an exemplary arrangement of a set of sensors on the planter of FIG. 5a, according to some embodiments of the present invention.

In another aspect, a set of sensors can be deployed within the planter system 500 of FIG. 5a, including within the liquid jet coulter system 514, to monitor system performance and conditions. FIG. 21 shows an exemplary arrangement of a set of sensors 2100 on the planter 500 of FIG. 5a, according to some embodiments of the present invention. For example, where the pump 504 is a direct drive pump, a sensor (e.g., an accelerometer) is disposed proximate to each cylinder of the pump 504 to monitor cylinder performance and detect impending failures.

Figure 22:
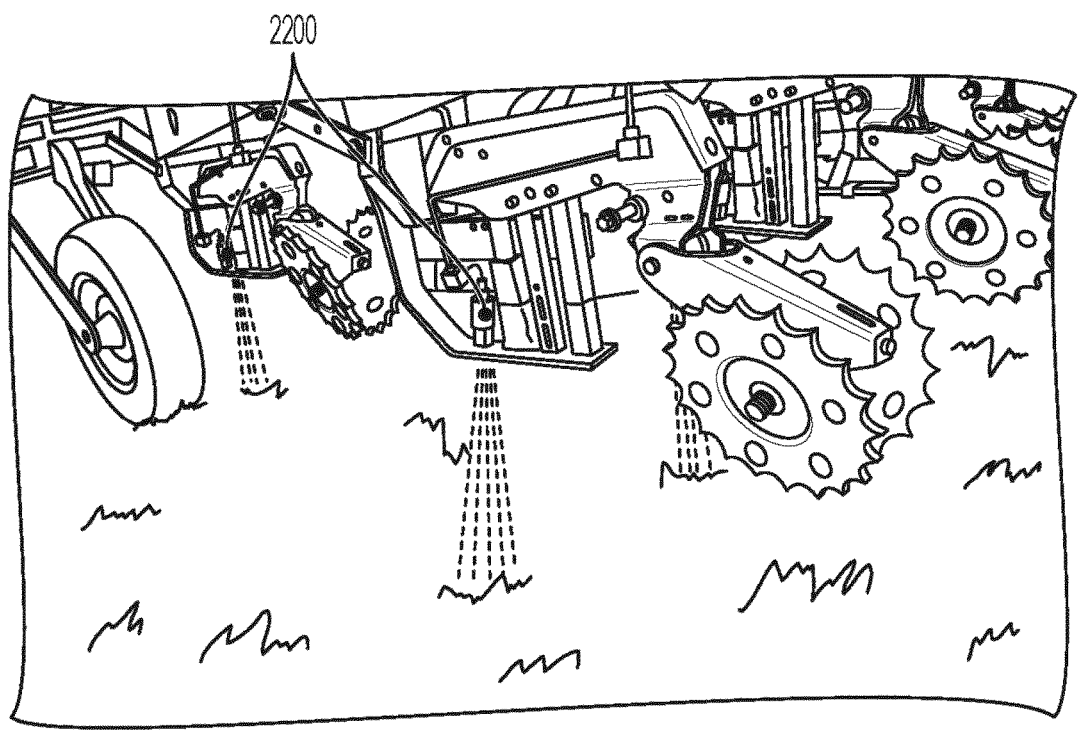
FIG. 22 shows an exemplary arrangement of a set of sensors disposed proximate to the nozzle of a liquid jet cutting head of the coulter system of FIG. 5a, according to some embodiments of the present invention.

FIG. 22 shows an exemplary arrangement of a set of sensors 2200 disposed proximate to the nozzle of a liquid jet cutting head 508 of the coulter system 514 of FIG. 5a, according to some embodiments of the present invention. These sensors 2200 can be accelerometers, optical sensors, etc. The sensors 2200 can be used to monitor jet formation and performance to determine, for example, when an additive is added. In some embodiments, accelerometers are disposed on the liquid jet coulter system 514 and/or the seeding device 515b as shown in FIGS. 21 and 22 to detect system fitness, performance, clogs or back pressure, when liquid is flowing through a liquid jet cutting head 508, cutting head nozzle health, etc.

In some embodiments, the high pressure and speed of the liquid jet emerging from the nozzle of the liquid jet cutting head 508 can be a danger to objects close to the nozzle, as such the planter system 500 is disabled when it is not close to the surface of the soil (e.g., when it is being lifted or folded up). Specifically, a sensor on the planter system 500 can be used to monitor and detect when the liquid jet coulter system 514 is on or near the ground (e.g., when the cutting head and/or nozzle is within a certain proximity to the ground). For example, a sonar sensor and/or a limit switch can be used to determine ground proximity and/or that the planter system 500 is unfolded and configured properly. If it is determined that a cutting head nozzle is not close enough to the ground (e.g., likely to generate a liquid jet that would shoot off into the air and potentially cause damage) or the planter system 500 is not configured properly, then the planter system 500 is configured to prevent liquid jet formation until the sensor is satisfied. In some embodiments, another sensor can be used to perform a nozzle health check before a cutting head 508 actually contacts the ground, such as determining if the nozzle of the cutting head 508 is blocked, blown, or plugged and/or that the mixing chamber of the cutting head 508 is flowing freely. The liquid jet coulter system 514 can be configured to disable the liquid jets from being dispensed from the cutting heads 508 unless the system senses that the planter system 500 is on the ground. In some embodiments a poor nozzle check can override the ground sensor and disable all operation until the planter system 500 is repaired.

In some embodiments, at least one sensor is used to monitor the one or more seed sources 540 of the planter system 500 of FIG. 5a to determine a fill level of the seed sources 540. The monitored information can be used to restock the seed sources 540 to the fill level by drones (e.g., via summoning once the fill level is below a threshold level). Each seed source 540 may include a visual sensor for identification and proper connection to the drone on approach.

In some embodiments, a shift valve (not shown) with an electric shift is located at an intensifier 506 of the coulter system of FIG. 5a, where the shift valve is used to transfer hydraulic flow from one side of the center section of the intensifier to the other. The shift valve enables a printed circuit board (PCB) of the planter system 500 to monitor the performance of the intensifier 506, thereby improving dynamic response of the system by performing directional switching as close to the intensifier 506 as possible. In addition, having a PCB that controls the shift valve at each intensifier allows for easier retrofits on existing planters. In some embodiments, an end-of-travel sensor (not shown) disposed on the intensifier 506 is adapted to trigger a "reverse" signal to the shift valve, allowing the intensifier 506 to expeditiously switch to the opposite direction. For example, the end-of-travel sensor can be a proximity switch on the ends of the hydraulic section of the intensifier 506. When the piston in the center section of the intensifier 506 travels to an end, the sensor is triggered which sends the signal to the PCB that subsequently conveys the signal to the shift valve to reverse direction. This type of monitored feedback can be implemented on each side of the intensifier 506. In addition, intensifier health information can be recorded for maintenance and record keeping. The health information can also be used to monitor failures, such as blown orifices or nozzles, via stroke rate count and correlation to various other sensors in the system 500, such as vibratory sensors and vacuum/whistle alerts.

Figure 23:
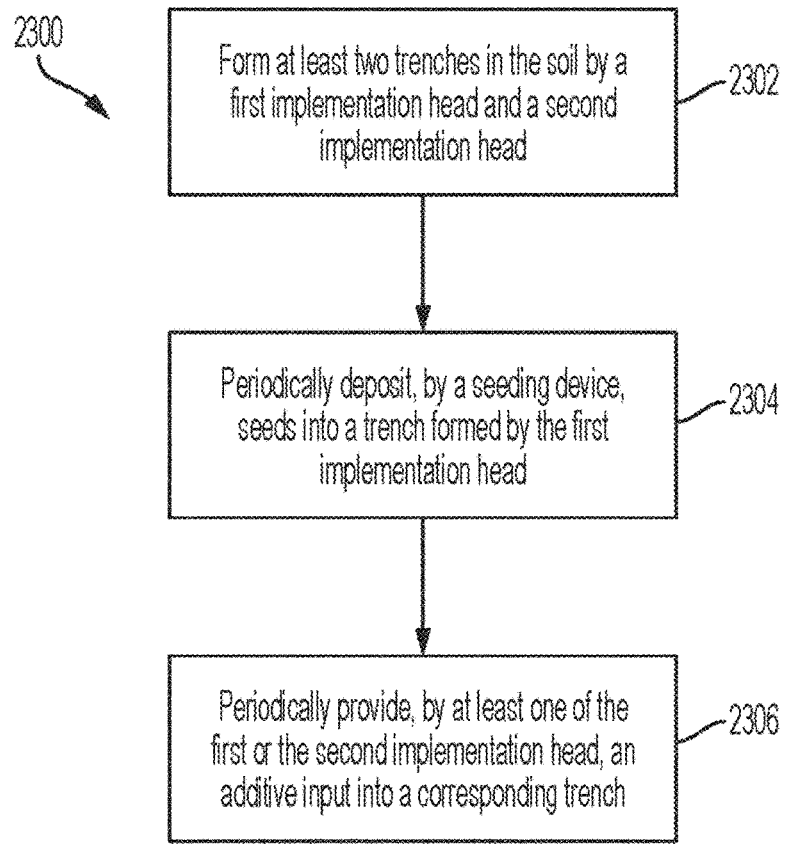
FIG. 23 shows an exemplary process for operating the planter of FIG. 5a, according to some embodiments of the present invention.

FIG. 23 shows an exemplary process 2300 for operating the planter 500 of FIG. 5a, according to some embodiments of the present invention. At step 2302 of the process 2300, the liquid jet coulter system 514, which includes at least two liquid jet cutting heads 508a, b, is activated to form at least two trenches in the soil. In some embodiments, all or a portion of the soil is frozen with the liquid jet(s) penetrating this frozen layer. The two cutting heads can be disposed on separate rows of planter 500, similar to the arrangement illustrated in FIGS. 12a and 12b. One of the trenches, such as the trench formed by the first cutting head, is configured to receive seeds for implantation. Thus, at step 2304 of the process 2300, a seeding device 515b can periodically deposit seeds into the trench formed by the first cutting head. The other trench, such as the trench formed by the second cutting head, is configured to receive an agricultural input. In some embodiments, the first cutting head can also inject an agricultural input into the first trench as it cuts the soil to form the first trench. Thus at step 2306 of the process 2300, at least one of the first or second cutting head can deposit an additive input into its corresponding trench. The first and second trenches can be located proximate to each other at a user-controllable distance.

In some embodiments, a third cutting head 508, which is positioned in a separate row of the planter 500 and in an offset or staggered relationship to the first and/or second cutting heads, is activated to periodically transect the first and second trenches to promote soil collapse on the additive input and the seed. The third cutting head 508 can thus be used to replace or supplement the closing device 516.

In some embodiments, each of the cutting head(s) used to supply the input to the soil is configured to mix an ultra high-pressure liquid and the input in a mixing chamber of the cutting head and dispense the mixture as a liquid jet into the corresponding trench. The ultra high-pressure liquid can be received by the cutting head from the ultra high-pressure pump 504 and the optional intensifier 506 via the set of ultra high-pressure lines 510. The input can be received by the cutting head from the input system 530 of the planter 500. In some embodiments, to prevent contamination of the mixing chamber and/or the input supply line, a way-one valve and a pressure regulation system 532 (e.g., a filtered vent) can be coupled to the input supply line. Alternatively, a positive pressure can be directly formed in the mixing chamber of the cutting head to minimize contamination. In some embodiments, as the cutting head delivers the liquid jet (without or without the input mixed therewith), the cutting head shrouds the liquid jet with a fluid medium between a tip of the nozzle and the surface of the trench.

It should be understood that various aspects and embodiments of the invention can be combined in various ways. Based on the teachings of this specification, a person of ordinary skill in the art can readily determine how to combine these various embodiments.

Modifications may also occur to those skilled in the art upon reading the specification.

What is claimed is:

1. A liquid jet soil processing system of an agricultural implement, the liquid jet soil processing system comprising:
   a frame defining a longitudinal axis extending between a proximal end and a distal end with at least one linkage pivot point between the proximal end and the distal end;
   a high-pressure liquid pump disposed on the frame distal to the linkage pivot point;
   at least one liquid jet cutting head coupled to the frame proximal to the linkage pivot point; and
   at least one high-pressure line fluidly connecting the high-pressure liquid pump to the at least one liquid jet cutting head across the linkage pivot point, the at least one high pressure line comprising at least one coil disposed at the linkage pivot point to allow for articulation and undulation during liquid jet soil processing system operation and transport.

2. The liquid jet soil processing system of claim 1, wherein the at least one coil comprises two or more coils located at a plurality of linkage pivot points along the frame.

3. The liquid jet soil processing system of claim 1, wherein the at least one coil is about 0.25 inches (0.63 cm) in diameter.

4. The liquid jet soil processing system of claim 1, wherein the at least one coil is about ⅜ inch (0.95 cm) in diameter.

5. The liquid jet soil processing system of claim 1, wherein the distal end of the frame is configured for connection to a mobile unit for transporting the liquid jet soil processing system.

6. The liquid jet soil processing system of claim 1, further comprising an opening device proximal to the linkage pivot point, the opening device configured to shape a trench created by the at least one liquid jet cutting head.

7. The liquid jet soil processing system of claim 1, further comprising a seeding device proximal to the linkage pivot point, the seeding device configured to seed a trench created by the at least one liquid jet cutting head.

8. The liquid jet soil processing system of claim 1, further comprising a closing device proximal to the linkage pivot point, the closing device configured to close a trench created by the at least one liquid jet cutting head.

9. The liquid jet soil processing system of claim 1, further comprising an intensifier distal to the linkage pivot point, wherein the intensifier in combination with the liquid pump are configured to draw liquid from a liquid tank and pressurize the drawn liquid.

10. The liquid jet soil processing system of claim 1, wherein a liquid pressure generated by the high-pressure liquid pump is at least 5,000 pounds per square inch (PSI).

11. The liquid jet soil processing system of claim 10, wherein the liquid pressure is between 5,000 PSI and 90,000 PSI.

12. The liquid jet soil processing system of claim 1, wherein the at least one high-pressure line is flexible and bendable.

13. A liquid jet soil processing system of an agricultural implement, the liquid jet soil processing system comprising:
   a frame having at least one dynamic point located between a proximal portion and a distal portion of the frame;
   an ultra high-pressure fluid jet pump coupled to the distal portion of the frame, the fluid jet pump configured to generate a pressure between 5,000 psi and 90,000 psi;
   a cutting head coupled to the proximal portion; and
   at least one high-pressure line connecting the fluid jet pump to the cutting head across the dynamic point, wherein the high-pressure line includes at least one coil on or adjacent to the dynamic point.

* * * * *